United States Patent
Piestun et al.

(10) Patent No.: US 11,327,330 B2
(45) Date of Patent: May 10, 2022

(54) 3D DIFFRACTIVE OPTICS

(71) Applicant: The Regents of the University of Colorado, Denver, CO (US)

(72) Inventors: Rafael Piestun, Boulder, CO (US); Haiyan Wang, Boulder, CO (US)

(73) Assignee: The Regents of the University of Colorado, a body corporate, Denver, CO (US)

(*) Notice: Subject to any disclaimer, the term of this patent is extended or adjusted under 35 U.S.C. 154(b) by 132 days.

(21) Appl. No.: 16/431,412

(22) Filed: Jun. 4, 2019

(65) Prior Publication Data
US 2019/0369411 A1    Dec. 5, 2019

Related U.S. Application Data

(60) Provisional application No. 62/680,470, filed on Jun. 4, 2018.

(51) Int. Cl.
*G02B 27/42* (2006.01)
*G02B 27/00* (2006.01)

(52) U.S. Cl.
CPC ..... *G02B 27/4205* (2013.01); *G02B 27/0012* (2013.01)

(58) Field of Classification Search
CPC .................. G02B 27/4205; G02B 27/0012
USPC ....................................................... 359/559
See application file for complete search history.

(56) References Cited

U.S. PATENT DOCUMENTS

| | | | |
|---|---|---|---|
| 6,343,307 B1* | 1/2002 | Mendlovic | G02B 5/20 708/191 |
| 2001/0013960 A1* | 8/2001 | Popovich | G02B 30/52 359/15 |
| 2005/0052716 A1* | 3/2005 | Joubert | G03H 1/2286 359/3 |
| 2006/0163463 A1* | 7/2006 | Grier | G03H 1/0808 250/251 |
| 2008/0037085 A1* | 2/2008 | Gabor | G11B 7/1381 359/24 |
| 2013/0252237 A1* | 9/2013 | Wagner | G01N 15/1436 435/6.1 |

(Continued)

OTHER PUBLICATIONS

Rafael Piestun, Boris Spektor, and Joseph Shamir. Wave fields in three dimensions: analysis and synthesis. vol. 13, No. 9/ Sep. 1996/ J. Opt. Soc. Am. A. (Year: 1996).*

(Continued)

*Primary Examiner* — Collin X Beatty

(57) ABSTRACT

Various embodiments provide for the implementation of volumetric diffractive optics equivalent functionality via cascaded planar elements. To illustrate the principle, a design 3D diffractive optics and implement a two-layer continuous phase-only design on a single spatial light modulator (SLM) with a folded system. The system provides dynamic and efficient multiplexing capability. Numerical and experimental results show this approach improves system performance such as diffraction efficiency, spatial/spectral selectivity, and number of multiplexing functions relative to 2D devices while providing dynamic large space-bandwidth relative to current static volume diffractive optics. The limitations and capabilities of dynamic 3D diffractive optics are discussed.

22 Claims, 17 Drawing Sheets

(56) References Cited

U.S. PATENT DOCUMENTS

2014/0204455 A1* 7/2014 Popovich ............. G02B 6/0028
359/316
2016/0283773 A1* 9/2016 Popovich ............. G02B 6/0026
2016/0291343 A1* 10/2016 Prasad ................... G02B 27/58

OTHER PUBLICATIONS

Joseph Rosen. Synthesis of nondiffracting beams in free space. Mar. 15, 1994 / vol. 19, No. 6 / Optics Letters (Year: 1993).*
Birks, T. A. et al., "The Photonic Lantern," Advances in Optics and Photonics, vol. 7, pp. 107-167, Apr. 13, 2015.
Gahlmann, Andreas et al., "Quantitative Multicolor Subdiffraction Imaging Of Bacterial Protein Ultrastructures In Three Dimensions," Nano Letters, vol. 13, pp. 987-993, Feb. 15, 2013.
Gerke, Tim D. et al., "Aperiodic Volume Optics," Nature Photonics, vol. 4, pp. 188-193, Mar. 2010.
Shechtman, Yoav et al., "Multicolour Localization Microscopy By Point-Spread-Function Engineering," Nature Photonics, vol. 10, pp. 590-595, Sep. 2016.
Tzang, Omer et al., "Adaptive Wavefront Shaping For Controlling Nonlinear Multimode Interactions In Optical Fibres," Nature Photonics, vol. 12, pp. 368-375, Jun. 2018.

* cited by examiner

3D DIFFRACTIVE OPTICS

CROSS-REFERENCE TO RELATED APPLICATIONS

This application claims priority to U.S. Provisional Application No. 62/680,470 filed Jun. 4, 2018, which is incorporated herein by reference in its entirety for all purposes.

STATEMENT REGARDING FEDERALLY SPONSORED RESEARCH

This invention was made with government support under grant numbers 1263236, 0968895, and 1102301 awarded by the National Science Foundation. The government has certain rights in the invention.

BACKGROUND

Diffractive optical elements (DOEs) and computer-generated holograms (CGHs) are 2D optical elements capable of modulating light fields. They are superior to optically recorded holograms in terms of customized wavefront generation from arbitrary wavefront illumination, which is due to the degrees of freedom offered by individually addressable pixels and possible optimization for a target metric. As a result, remarkable advances have been achieved in application fields including optical tweezers, beam shaping, holographic display, novel microscopies, optogenetics excitation, and femtosecond laser micromachining.

Previous work has shown that additional degrees of freedom and functionality can be acquired by extending the diffractive optics from 2D to 3D. Accordingly, system performance metrics improve, including enhanced diffraction efficiency, better angular or frequency selectivity, and capability to generate space variant functions. Cascades of 2D diffractive optics have been demonstrated and experiments have shown improved diffraction efficiency as well as angular multiplexing of two diffraction patterns. Full volume designs have been implemented applying 3D scattering theory and projection onto constraint sets (POCS) algorithms. Experiments have demonstrated both angular and frequency multiplexing. However, 3D lithographic methods still limit the implementation to relatively low space-bandwidth devices and mostly to binary form, which restrict the design degrees of freedom and performance. Further, once the devices are fabricated, no dynamic changes are allowed due to the permanently induced material modification. Volumetric spatial light modulators (SLM) with capability to modulate micro-voxels would provide a unique opportunity to this field. Unfortunately, it does not seem that a viable device has ever been conceived or demonstrated.

Liquid crystal based SLMs are dynamic 2D wavefront shaping devices with high efficiency and high resolution. These systems allow switching rates of 100s of Hz enabling dynamic 2D diffractive optics. However, the phase patterns displayed on SLM are two-dimensional; hence, these systems only work optimally for a certain wavelength due to diffractive and material dispersion. A simple solution for display applications is to use spatially or time multiplexed 2D phase patterns on a single or multiple SLM, with each phase pattern corresponding to a different color. While these methods are appropriate for display, these methods cannot implement the space or frequency variant functionality of volume diffractive optics.

Angular and frequency (wavelength) multiplexing are most common forms of encoding information in a volume. Previous approaches aimed at multi-wavelength operation of 2D diffractive optics are based on multiple-order diffractive optics, namely devices implementing phase delays beyond $2\pi$. These approaches are based on surface-relief fabrication or liquid-crystal SLM. However, these methods are capable of a limited spectral bandwidth selectivity, enabling independent control of two or at most three color bands, making them inappropriate to control a large number of spectral bands as possible with volumetric optics. Late investigation of diffractive optics incorporating sub-wavelength structures, also called meta-surface optics, provides interesting opportunities for multifunctional devices.

SUMMARY

Various embodiments provide for systems and methods to create and utilize 3D optics on 2D devices, such as a dynamic SLM, or cascades of such 2D devices, either in transmission or reflection geometry. In accordance with some embodiments, the 3D optics can be designed using a POCS algorithm with distribution-on-layers to spread information among multiple thin diffractive optical elements. 3D DOEs not only enhance the design degrees of freedom and coding capacity, but also enable properties unique to volume (thick) holograms, such as having only one diffraction order, improved efficiency with lower crosstalk, and capability for multiplexing in angular, frequency, phase, or azimuth rotation. Various embodiments of the design can be implemented on widely available SLMs, which are capable of switching the designed phase patterns at relatively high frame rates, thus enabling operation with multiple wavelengths or codes both simultaneously and dynamically.

The results show that light fields are modulated in multiple dimensions with a compact and efficient system. Independent information is successfully encrypted and read out, with high efficiency and low crosstalk. This approach will benefit from the ever-increasing computational power and advances in SLM technology.

Some embodiments provide a method to generate 3D diffractive optics functionality via 2D diffractive optical devices. The method can include initializing a layer design of multiple layers of a diffractive optics element. A user-defined output of multiplexed fields with corresponding input multiplexed fields can be generated or received. Then, some embodiments can forward propagate the input multiplexed fields and backward propagate the output multiplexed fields before and after each of the multiple layers. A parallel projection can be generated at each of the multiple layers to create an updated layer deign.

Embodiments of the present invention also include computer-readable storage media containing sets of instructions to cause one or more processors to perform the methods, variations of the methods, and other operations described herein.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

DESCRIPTION OF THE DRAWINGS

Embodiments of the present technology will be described and explained through the use of the accompanying drawings.

Figure 1A:
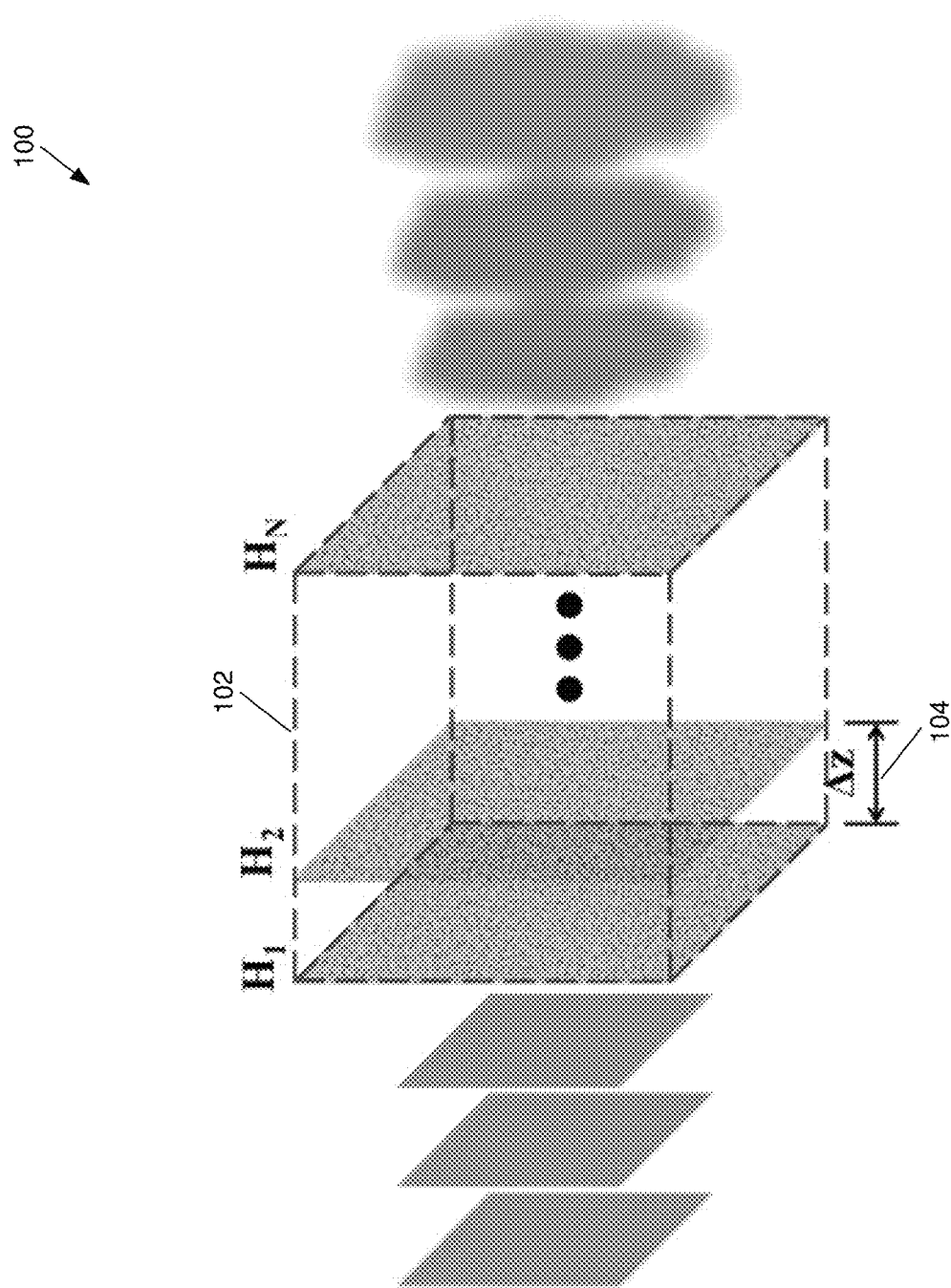
FIG. 1A illustrates an example of a 3D diffractive optics implementation via 2D optics showing a decomposition in stratified layers.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Diffractive optics is a topic of significant interest, in part fueled by the emerging area of metasurfaces and their applications, as well as the more traditional applications in optical tweezers, microscopy, and optogenetics. Interestingly, practical results are still scarce. To date there is no established methodology to generate such 3D devices. For example, some traditional solutions have relied on difficult-to-scale 3D lithography implemented with femtosecond pulses which were limited to weakly scattering structures.

In contrast, various embodiments of the present technology present system and techniques to generate 3D functionality via 2D devices. As opposed to the traditional use of two planar diffractive elements to encode amplitude and phase, various embodiments of the present technology provide a carefully designed arrangement of diffraction, imaging, and propagation that provides the functionality of a volumetric structure, namely space variance, multiplexing in wavelength and space, as well as higher information capacity, among others. For example, with various embodiments of the present technology, a system can be configured to generate and couple multiple modes into a multimode fiber, each matched in frequency and spatial shape, e.g. modes with angular momentum of various wavelengths. Further, some embodiments allow for the use of 3D optics to analyze (demultiplex) the modes coming out of such a system. In a totally different application, 3D diffractive optics could be used in multi-color single-molecule localization microscopy with higher efficiency and capacity than what has been recently demonstrated.

The capacity of 3D elements to encrypt information is applicable to cryptography, security, anti-counterfeiting, and optical locks.

The increase information capacity of 3D optics enables application in optical memories for storage of information or in the generation of optical interconnections, useful for neural networks hardware.

Various embodiments of the present technology further contribute to the inverse problem solution by solving the nonlinear inverse problem of finding the 3D diffractive optics that achieves a given task without the need to assume weak scattering structures. Note that while no prior report has been able to demonstrate computer generated diffractive optics capable of multiplexing more than two functions, various embodiments of the present technology show seven and the potential for even more.

Emerging areas such as computational imaging, multimode fiber communications, superresolution single-molecule imaging, among others, require new device approaches designed with a systems' perspective. 3D diffractive optics not only presents interesting physical phenomena but can also lead to breakthrough innovations given the current state of the art in planar SLM technologies and this contribution in the computational design enabled by current computational capacities. Various embodiments of the present technology provide an innovative theoretical model, design approach, modelling to analyze the fundamental opportunities and limitations of the approach, as well as experiments that confirm the predicted performance.

Complex wavefront modulation and spatio-spectral shaping are of the foremost interest to the wide Optics community. Various embodiments of the present technology provide a significant advance in conceptual understanding because these embodiments propose, demonstrate, and explain for the first time, the possibility of controlling light across independent channels with planar optics, leading to novel spatio-spectral opportunities. Furthermore, some embodiments enable for the first time the implementation of 3D optics functionality dynamically.

Because 3D diffractive optics control different spectral components independently, the 3D diffractive optics can be used to control ultrashort pulses in time and space. 3D diffractive optics can be also used in some embodiments to correct non-isoplanatic (space variant) aberrations. For instance, some embodiments can generate a correcting wavefront (conjugate or aberration) for each direction of light incoming to the device. Some embodiments include a multiple-layer 3D diffractive optics for coma correction as an example of non-isoplanatic aberration correction.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. Various embodiments of the dynamic 3D DOEs may be beneficial for numerous applications that require independent multi-color operation. For example, for an imaging lens, chromatic aberrations could be corrected at different wavelengths by pre-shaping the wavefront with a frequency multiplexing scheme. In optical tweezers, where attractive or repulsive force is generated from focused laser beams, 3D DOEs could implement multiple dynamic independent focused beams at different wavelengths, thus achieving manipulation of multiple microscopic objects. Other interesting applications include point-spread function engineering for superresolution fluorescence microscopy, beam steering, 3D display, and data storage.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

Various embodiments of the present technology provide techniques for 2D implementation of 3D diffractive optics that enables dynamic control of high volumetric bandwidth elements. Some embodiments allow for the design 3D diffractive optics composed of multiple diffractive layers using a POCS algorithm, which is a more general version of the Gerchberg-Saxton iterative optimization algorithm. Some embodiments also implement the design on a liquid crystal SLM, which enables dynamic and multi-level phase modulation. The SLM can be spatially divided to accommodate different layers, and each layer is diffraction propagated using a concave mirror. Theoretical and experimental investigations of multilayer devices in terms of diffraction efficiency and spatial/spectral multiplexing properties provide insights into some embodiments.

Model

Figure 1B:
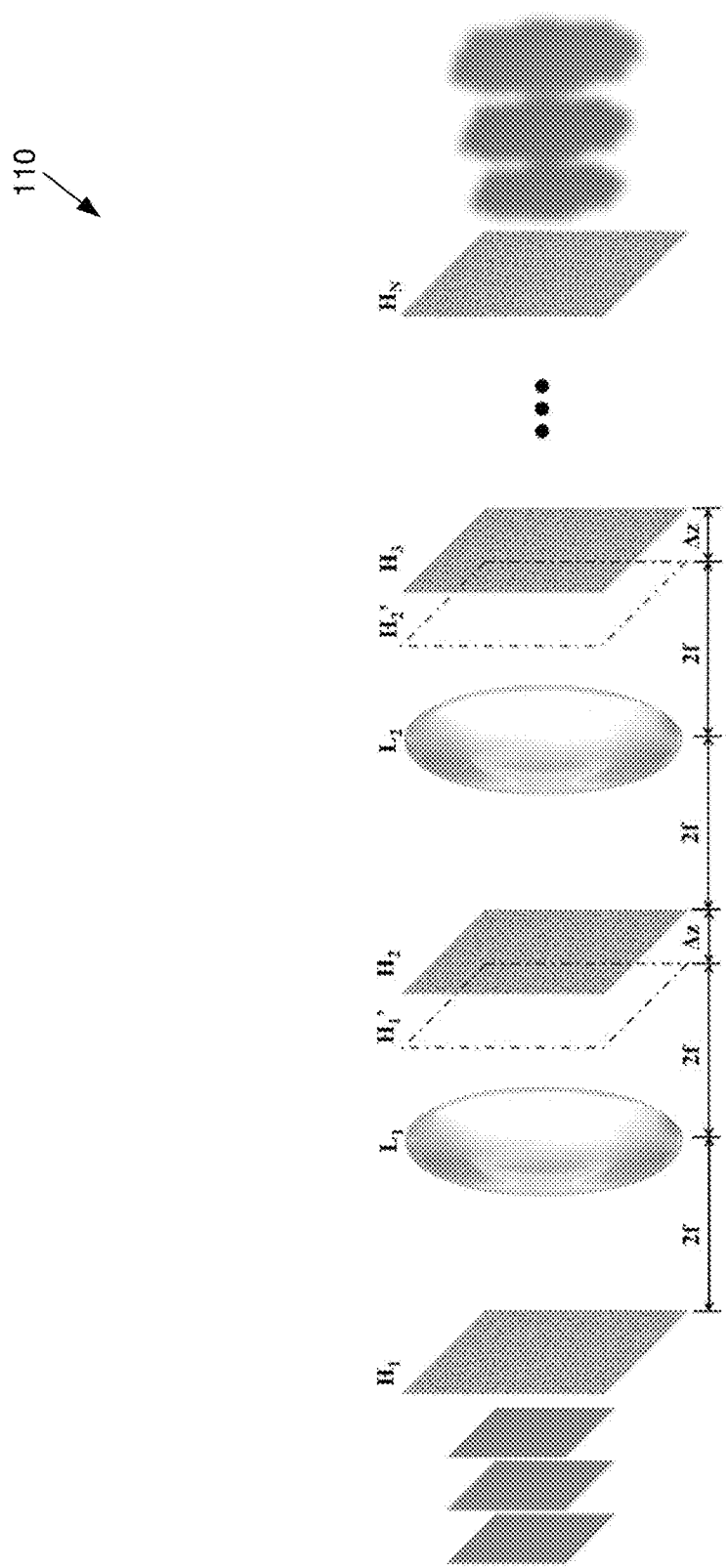
FIG. 1B illustrates an equivalent cascaded system using imaging optics.
Figure 1C:
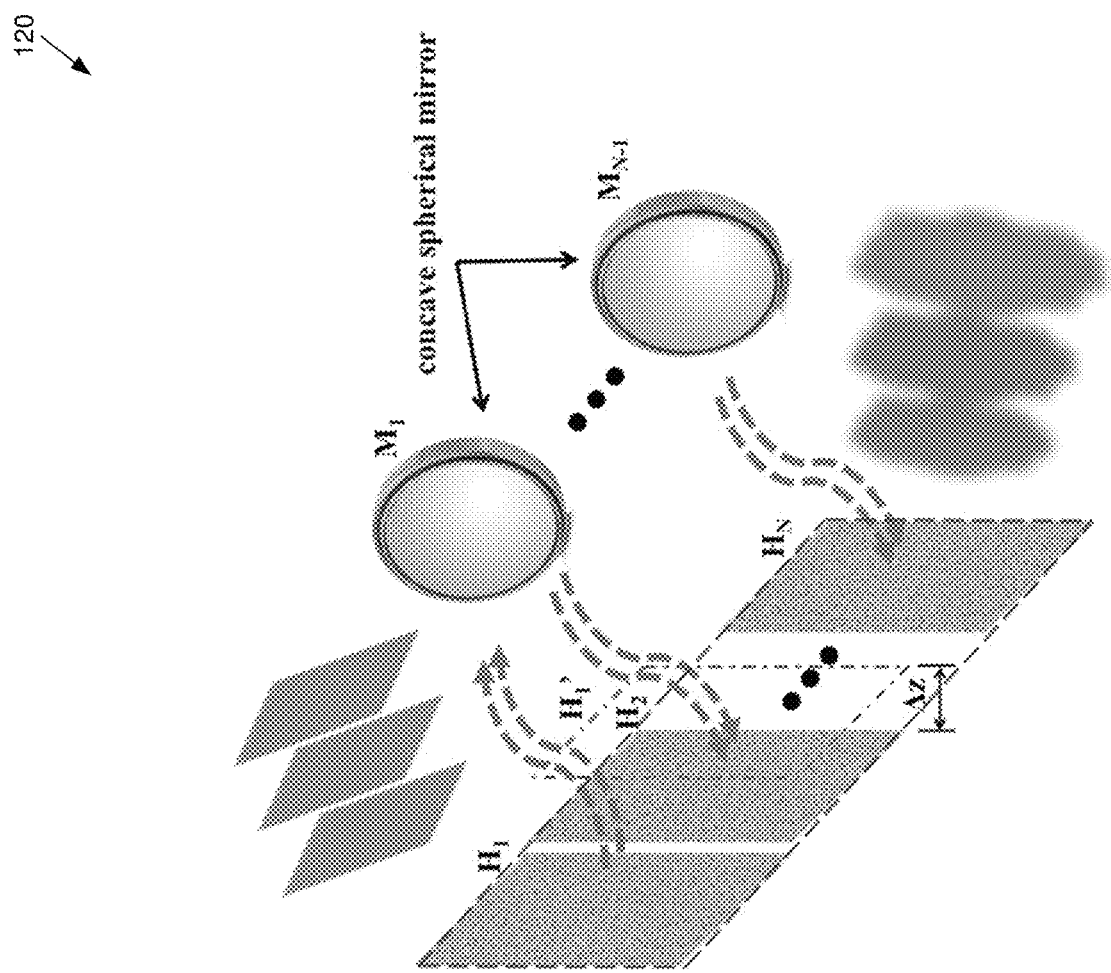
FIG. 1C illustrates an example of a 3D diffractive optics folded implementation on single spatially multiplexed DOE (e.g. SLM) with spherical mirrors.

FIG. 1A illustrates an example of a 3D diffractive optics implementation 100 via 2D optics showing a decomposition in stratified layer. FIG. 1B illustrates an equivalent cascaded system 110 using imaging optics. FIG. 1C illustrates an example of a 3D diffractive optics folded implementation 120 on single spatially multiplexed DOE (e.g. SLM) with spherical mirrors.

3D diffractive optics consists of, or can be represented by, multiple thin, cascaded DOEs, which are spatially separated by short distances, in optically homogenous medium. As light propagates through the 3D optics, the amplitude and phase are modulated by each DOE and diffraction occurs in the intermediate homogeneous regions (FIG. 1A). This model also applies to volume optics that continuously reshape light on propagation by considering infinitely thin homogenous layers. Considering only one single layer, the model exhibits Raman-Nath characteristics because the thickness is infinitesimal. However, the 3D diffractive optics altogether shows Bragg-like behavior as a result of the diffraction in multiple DOEs and buffer layers. This property can be used for multiplexing, both in frequency and angular domains and to generate space variant systems, as demonstrated below.

Therefore, to emulate a 3D diffractive optical element, various embodiments may use stratified layers 102 separated by a short distance $\Delta z$ (104). The transformation by diffraction between layers, namely free-space propagation through a distance $\Delta z$ (104) is equivalent to imaging with unit magnification followed by free-space propagation of $\Delta z$ (FIG. 1B). This equivalent, depicted in FIGS. 1A-1C, enables physical separation among layers while achieving the same functional form as a 3D optical element. Hence, existing planar (2D) diffractive technology can be implemented to generate 3D diffractive optics functionality.

Furthermore, this approach is also amenable to implementation in folded systems, for instance by substituting the lens by a concave spherical mirror. As a result, the 3D design can be implemented on a single 2D plane (FIG. 1C), enabling display on a single phase-only DOE or a liquid-crystal SLM, which is spatially multiplexed to display the different layers.

Figure 2:
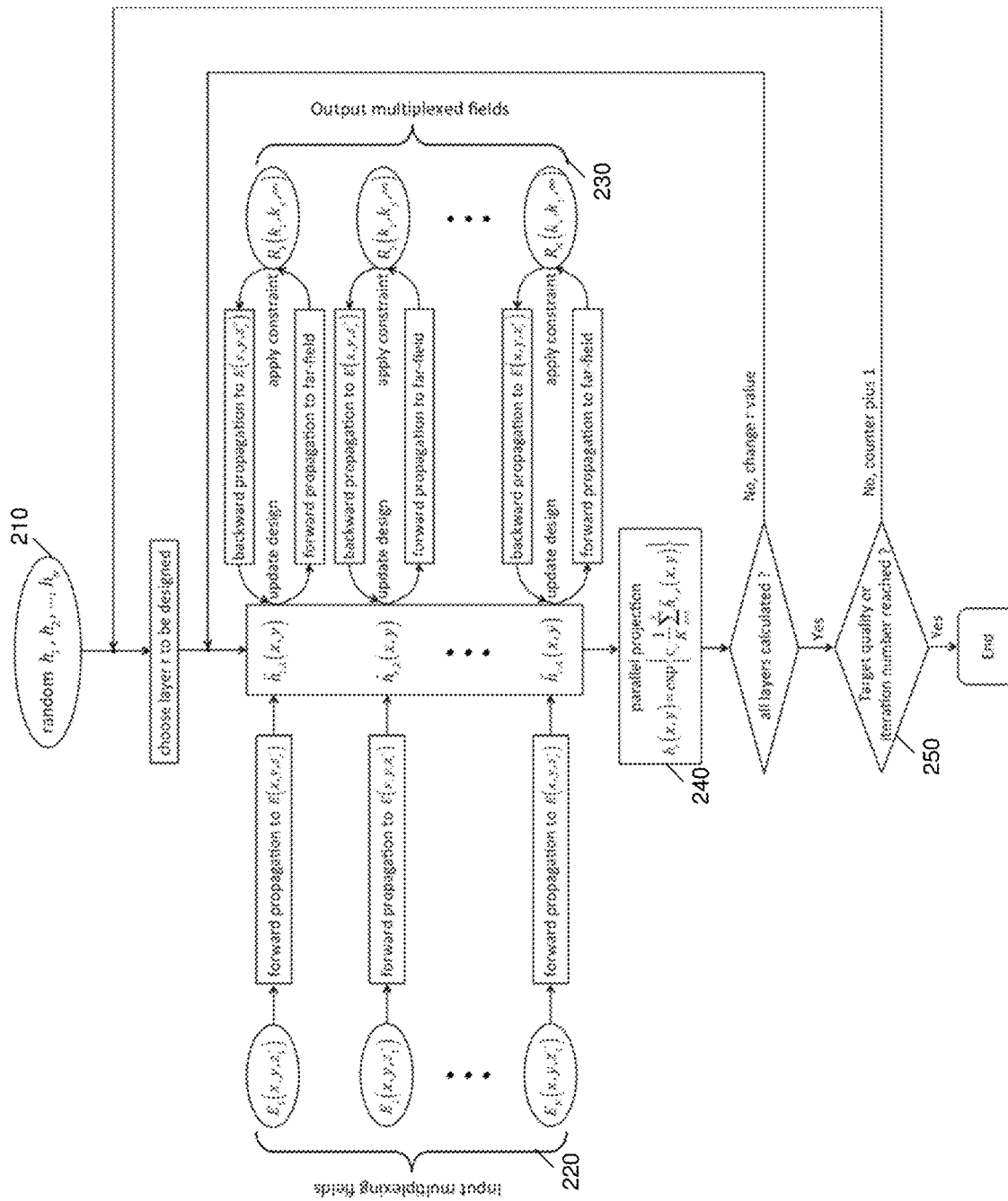
FIG. 2 is a flowchart with an example set of operations illustrating the projection onto constraint sets with a distribution-on-layers algorithm that may be used in one or more embodiments of the present technology.

FIG. 2 is a flowchart with an example set of operations 200 illustrating the projection onto constraint sets with a distribution-on-layers algorithm that may be used in one or more embodiments of the present technology. As illustrated in FIG. 2, $h_1, h_2, \ldots, h_N$, are layers to be designed, and are set random (210) prior to the computation. $R_1(x, y, \infty), R_2(x, y, \infty), \ldots, R_K(x, y, \infty)$ are user-defined output multiplexed fields with the corresponding input multiplexing fields $E_1(x, y, z_1^-), E_2(x, y, z_1^-), \ldots, E_K(x, y, z_1^-)$. The input field (220) and output field (230) are forward and backward propogated respectively to the field before and after the layer to be designed. The modulation function can be updated during several iterations for each multiplexing pair and for each layer in the 3D diffractive optics. The process is followed by a parallel projection (240) to ensure all the information is being encrypted and evenly distributed among all the N layers. The optimization algorithm ends when the target quality or the preset iteration number is reached (250).

To illustrate some embodiments in more details, consider the scalar approximation to be valid under the assumption that the feature size is large relative to the wavelength of operation. The complex transmittance function of each thin DOE can be expressed as $$h_k(x,y) = |h_k(x,y)| \exp[j\phi_k(x,y)] \quad (1)$$

where k is the layer number. To achieve maximum efficiency, consider pure phase modulation, with the amplitude term always unity. Under the thin-element approximation, the effect of a single DOE layer on the complex amplitude is $$E(x,y,z_k^+) = h_k(x,y) E(x,y,z_k^-) \quad (2)$$

where $z_k^-$ and $z_k^+$ and indicate the planes immediately before and after the kth DOE, respectively. The wave-field evolution between adjacent DOEs can be described by angular spectrum propagation in free space. It should be noticed that the wave-field picks up a quadratic phase term after a single lens or upon reflection from the spherical mirror. Therefore, the relation between the complex amplitude after the $k^{th}$ layer and the wave-field before the $k+1^{th}$ layer can be expressed as $$E(x, y, z_{k+1}^-) = \mathscr{F}^{-1}\left\{ e^{-j\sqrt{k_0^2 - k_x^2 - k_y^2}\cdot \Delta z} \cdot \mathscr{F}\left[ E(-x, -y, z_k^+) \cdot e^{j\frac{2\pi}{\lambda}(x^2+y^2)\cdot 2f} \right] \right\} \quad (3)$$

where $\lambda$ is the design wavelength, $\Delta z$ is the layer separation, and f is the focal length of the lens or spherical mirror. If a Fourier lens is placed one focal length after the last DOE layer, the complex amplitude at the reconstruction plane satisfies $$R(k_x, k_y, \infty) = \mathscr{F}\{E(x,y,z_N^+)\} \quad (4)$$

Hence, the relation between the 3D diffractive optics and the far-field reconstruction is obtained. The propagation process is also numerically reversible, namely waves can be back-propagated from the target $R(k_x, k_y, \infty)$.

While different design strategies can be anticipated, various embodiments allow for design of the multiplexing 3D diffractive optics using a POCS algorithm with distribution-on-layers. To calculate a 3D DOEs layer by layer, some embodiments first start by setting all of them to have a random phase and unit amplitude. Then, some embodiments can calculate the transmission function of the layer r by first calculating the wave-field before the layer r, $E(x, y, z_r^-)$, $r \in [1, \ldots, N]$. This process starts from the input $E(x, y, z_r^-)$ and follows equations (1)-(4).

For backward propagation, some embodiments start with the desired reconstruction field $\bar{R}(k_x, k_y, \infty)$, and use the inverse propagation (conjugate of equations (1)-(4)) to calculate the wave-field after the rth layer, $E(x, y, z_r^+)$. The transfer function for layer r is then obtained as follows $$\tilde{h}_r(x, y) = \frac{E(x, y, z_r^+)}{E(x, y, z_r^-)} \quad (5)$$

where $h_r(x,y)$ is a complex function, so its phase can be extracted by projecting onto the set of phase-only functions $$h_r(x,y) = \exp\{\tilde{h}_r(x,y)\} \quad (6)$$

Some embodiments can then perform forward propagation through the 3D diffractive optics. It is mostly likely that the field on the reconstruction plane will no longer match the original target. Hence, various embodiments employ a generalized projection algorithm, which iterates between each layer and the reconstruction plane, applying equations (1)-(4) and their conjugate form. The algorithm keeps running until the deviation from the reconstruction plane and target is acceptable.

This process provides the transmission function for one layer of 3D diffractive optics. The remaining layers can be calculated following the same process. The layers can be calculated in sequential form, random fashion, or in parallel. As a result, the encoded information is evenly distributed among all the layers. This can significantly increase the design degrees of freedom and coding capacity of the 3D diffractive optics.

Volumetric optics enables methods of multiplexing which can be implemented by design in 3D diffractive optics. Compared to 2D DOEs, the 3D counterpart exhibit strong angular or wavelength selectivity, i.e., different uncorrelated outputs can be achieved with different inputs in a single 3D diffractive optical element. For instance, one can change the initial condition $E_p(x, y, z_1^-)$ to reconstruct different predefined images $R_p(x\ y, \infty)$, respectively. The input can be addressed via wavelength, angle of incidence, or phase pattern $$E_p(x, y, z_1^-) = \begin{cases} A\exp\left\{i\frac{2\pi}{\lambda}x\sin\varphi_p\right\}, & \text{angular multiplexing} \\ A\exp\left\{i\frac{2\pi}{\lambda_p}\right\}, & \text{frequency multiplexing}, p = 1, 2, \ldots, K \\ A\exp\{i\varphi_p(x, y)\}, & \text{phase multiplexing} \end{cases} \quad (7)$$

where K is the total number of pages to be multiplexed. For each input and its corresponding reconstruction, every single layer DOE is calculated by the same procedure described above. Finally, to take all the multiplexed information into account, some embodiments apply parallel projections as follows $$h_r(x, y) = \exp\left\{c_r \frac{1}{K}\sum_{p=1}^{K} \tilde{h}_{r,p}(x, y)\right\} \quad (8)$$

where $c_r$ is a coefficient to facilitate algorithm convergence. Every layer of the 3D diffractive optics is calculated in this fashion, thus concluding one iteration. The generalized projection algorithm runs until a satisfactory result is reached.

Simulation

The algorithm described above has been used to design 3D DOEs of more than 16 layers on a desktop computer. To illustrate the principle, a design of a two-layer 3D diffractive optics was created. The pixel number in each layer is 128×128, with pixel size of 8 μm×8 μm. The layer separation is set to be Δz=486 μm. Those parameters are chosen to adapt to the SLM used in the experiment, as shown in the next section.

Figure 3A:
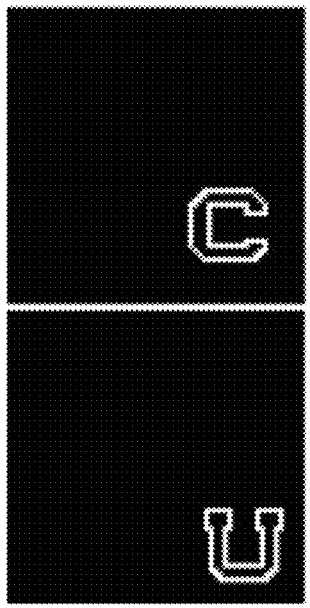
FIG. 3A illustrates simulation results for multiplexing 3D diffractive optics where the letters "C" and "U" in the CU logo are the target images in accordance with various embodiments of the present technology.
Figure 3B:
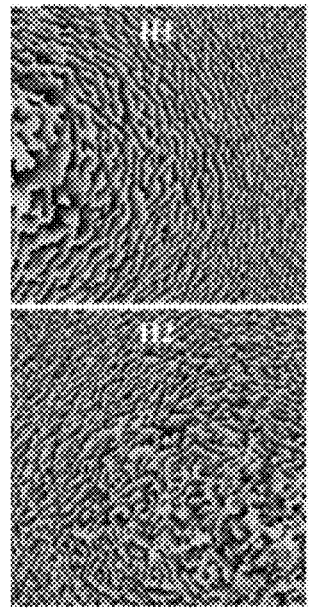
FIG. 3B illustrates simulation results for multiplexing 3D diffractive optics with phase patterns designed for angular multiplexing in accordance with various embodiments of the present technology.
Figure 3C:
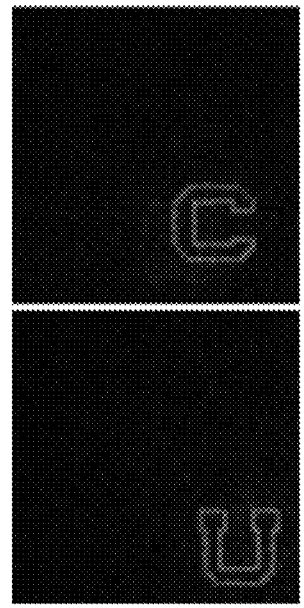
FIG. 3C illustrates simulation results for multiplexing 3D diffractive optics showing reconstructed image with incident angle at 7° and 10° showing angular multiplexing in accordance with some embodiments of the present technology.
Figure 3D:
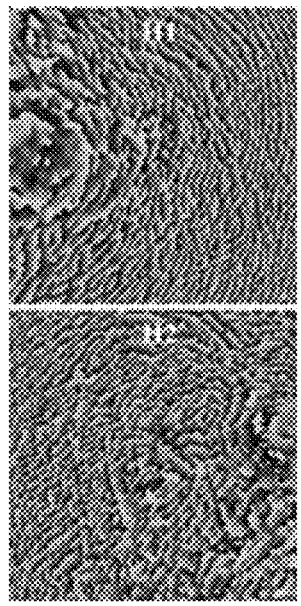
FIG. 3D illustrates simulation results for multiplexing 3D diffractive optics showing phase patterns designed for frequency multiplexing in accordance with one or more embodiments of the present technology.
Figure 3E:
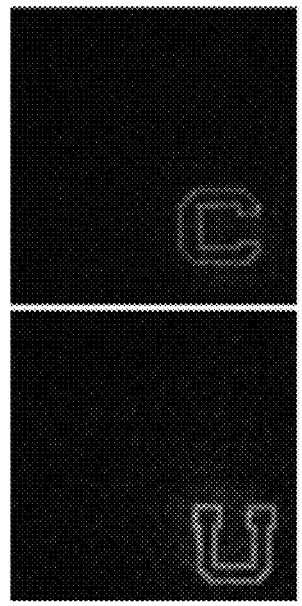
FIG. 3E simulation results for multiplexing 3D diffractive optics displaying the reconstructed image with 633 nm and 532 nm illumination showing frequency multiplexing in accordance with various embodiments of the present technology.

For angular multiplexing, the letter "C" and "U" from the CU logo (FIG. 3A) as the target images for incident angles at 7° and 10°, respectively, was used. The wavelength of the incident beam is 633 nm. The reconstructed image is shown in FIG. 3C. For frequency multiplexing, the same two patterns with the incident angle fixed at 7°, and the wavelength of illumination 633 nm for "C" and 532 nm for "U" were used. The reconstructed image is shown in FIG. 3E. The phase patterns for the above two cases are shown in FIGS. 3B and 3D, respectively, as calculated with the procedure described above.

Some embodiments can use diffraction efficiency (DE) and relative error (Err) to evaluate the performance of the designs. The diffraction efficiency can be defined as the ratio of the intensity in the target area to the intensity of the input beam, and can be calculated by the following equation:

$$DE = \frac{\int\int |U_R(k_x, k_y, \infty)|^2 v_b(k_x, k_y) dk_x dk_y}{\int\int |E(x, y, z_1^-)|^2 dx dy} \quad (9)$$

where $U_R$ is the reconstructed field in wave-vector coordinates, and $v_b(k_x,k_y)$ is the target region in binary form, i.e., the target domain. The relative error is used to measure the quality of the reconstruction relative to the total light intensity directed on target:

$$Err = \frac{\int\int ||U_R(k_x, k_y, \infty)|^2 - c_i v_b(k_x, k_y)|^2 dk_x dk_y}{\int\int |U_R(k_x, k_y, \infty)|^2 v_b(k_x, k_y) dk_x dk_y} \quad (10)$$

where $c_i$ is a weighting factor that changes with iteration number i to ensure the algorithm converges.

The diffraction efficiencies for C and U in the angular multiplexing example are 54.2% and 59.1%, respectively, while the relative errors are 0.13 and 0.10, respectively. For frequency multiplexing, the efficiencies are 62.5% and 65.5%, whereas the relative errors are 0.16 and 0.14.

Figure 4A:
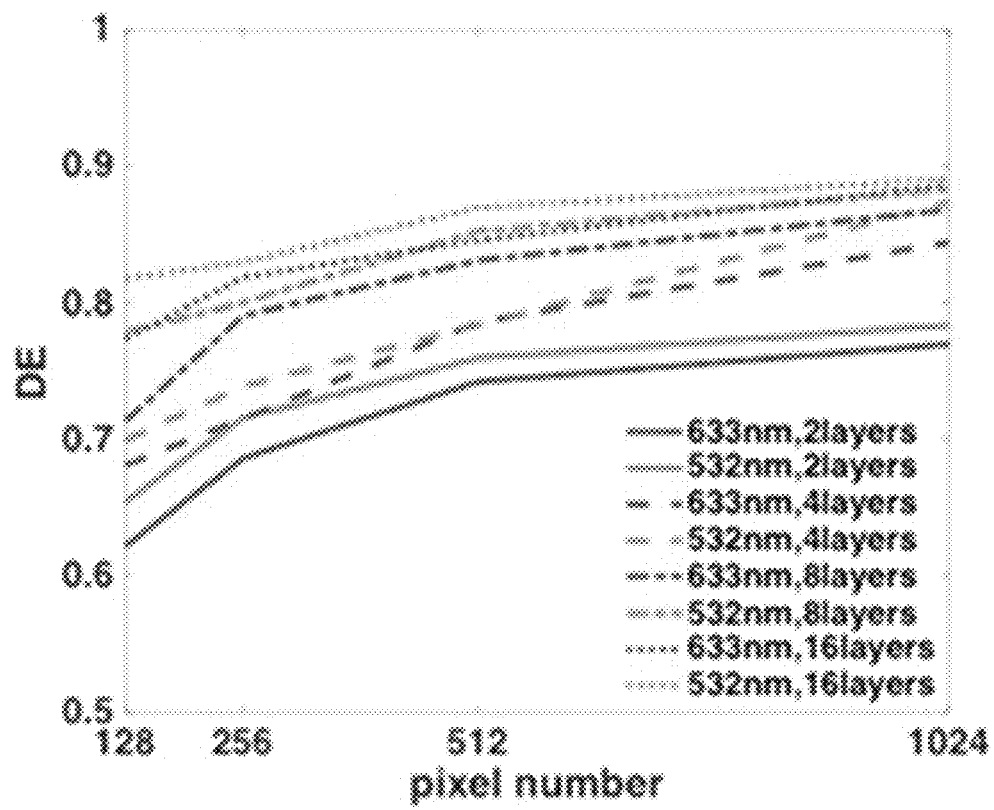
FIG. 4A illustrates characterization of 3D diffractive optics in case of frequency multiplexing having diffraction efficiency of the letter "C" under 633 nm illumination and "U" under 532 nm illumination as functions of the number of pixels and the number of layers in accordance with some embodiments of the present technology.

Various embodiments use the relations between diffraction efficiency and parameters such as number of pixels, number of layers, and layer separation. For example, some embodiments use the scheme for frequency multiplexing. First, the number of layers can be expanded to 4, 8, and 16, and for each case, the number of pixels can be changed to 256×256, 512×512, and 1024×1024. The diffraction efficiency for "C" under 633 nm illumination and "U" under 532 nm illumination are plotted in FIG. 4A. Both the number of pixels and number of layers are positively related to the degrees of freedom of the device. Therefore, with all other parameters unchanged, the diffraction efficiency can be enhanced by increasing the number of pixels or the number of layers. A longer computation time is required, which at some point can make the problem intractable. For example, the calculation of 16 layers with 2048×2048 pixels is beyond the computational power of a 2.8 GHz quad-core CPU with 12 Gb memory and could be tackled with parallel computation in some embodiments.

Figure 4B:
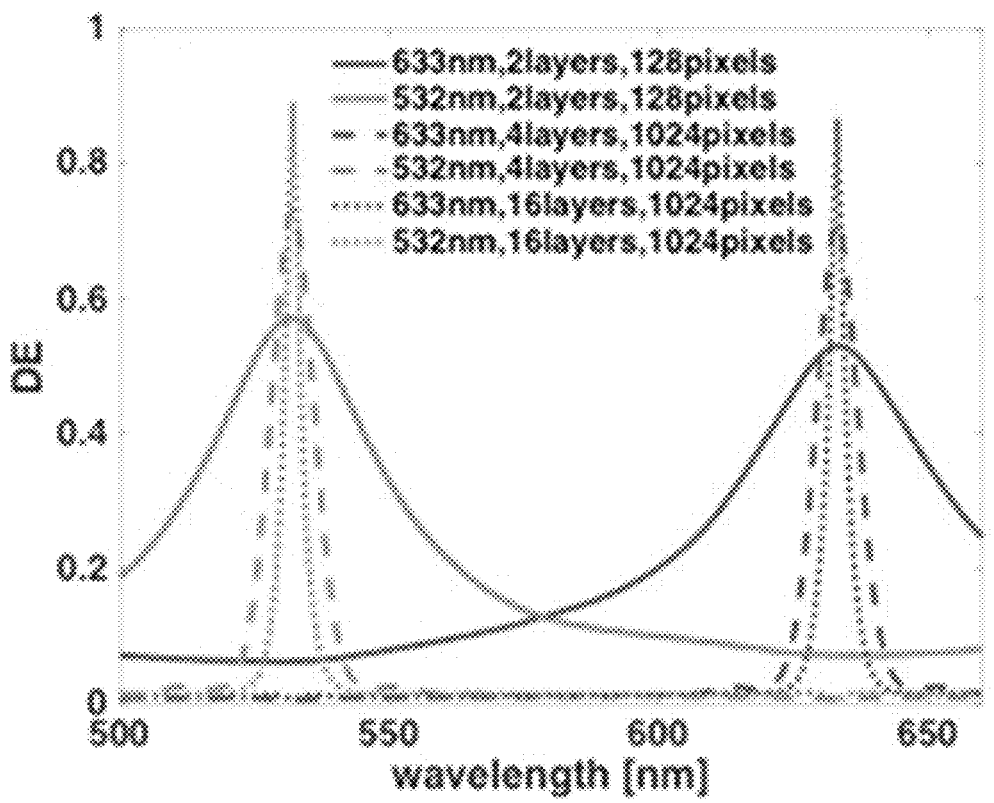
FIG. 4B illustrates characterization of 3D diffractive optics in case of frequency multiplexing having wavelength selectivity for the letters "C" and "U" as a function of the number of pixels and the number of layers in accordance with one or more embodiments of the present technology.

Second, the effect of pixel and layer number on wavelength selectivity can be exploited in some embodiments. The results are shown in FIG. 4B. Start with 2 layers of 128×128 pixels, and reconstruct the 3D diffractive optics with wavelength from 500 nm to 660 nm, the diffraction efficiency of "C" and "U" are recorded respectively. Then, some embodiments, use 4 layers with 1024×1024 pixels and record the data in the same way. Both the diffraction efficiency increases and the wavelength selectivity improves with additional degrees of freedom.

Figure 4C:
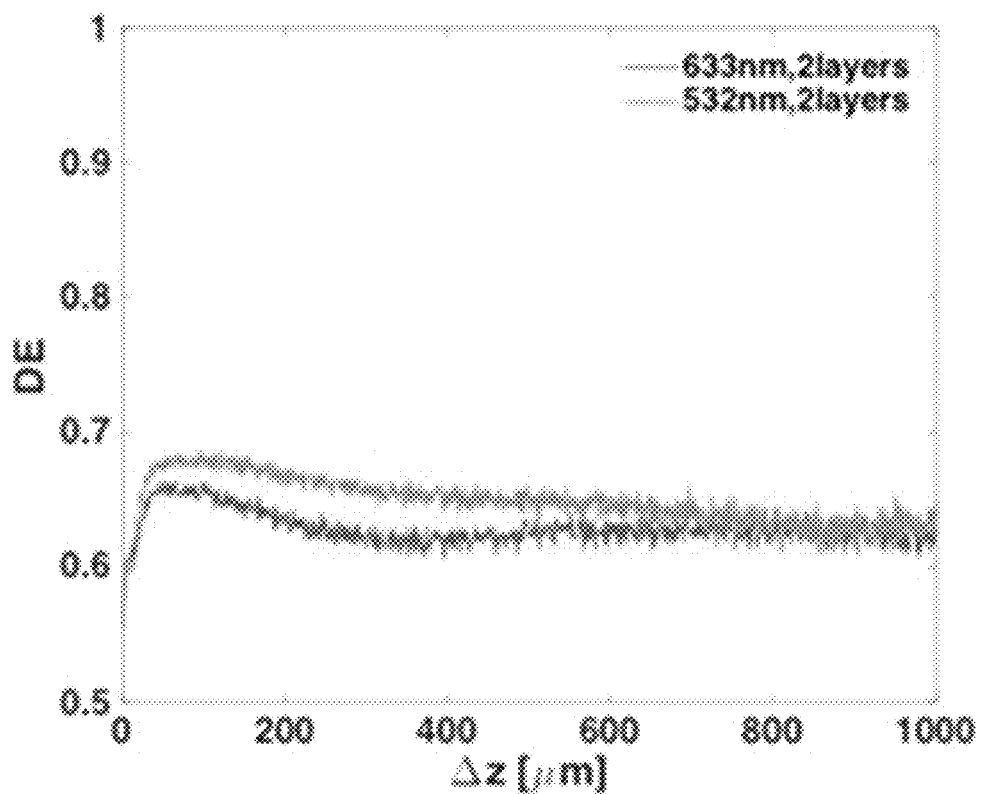
FIG. 4C illustrates characterization of 3D diffractive optics in case of frequency multiplexing showing diffraction efficiency of the letters "C" and "U" as a function of layer separation according to various embodiments of the present technology.

Third, some embodiments can analyze the diffraction efficiency as a function of layer separation, shown in FIG. 4C. The layer separation can be changed, for example, from 1 μm to 1 mm, for two-layer elements of 128×128 pixels. Typically, there is little effect of layer separation on diffraction efficiency.

Figure 4D:
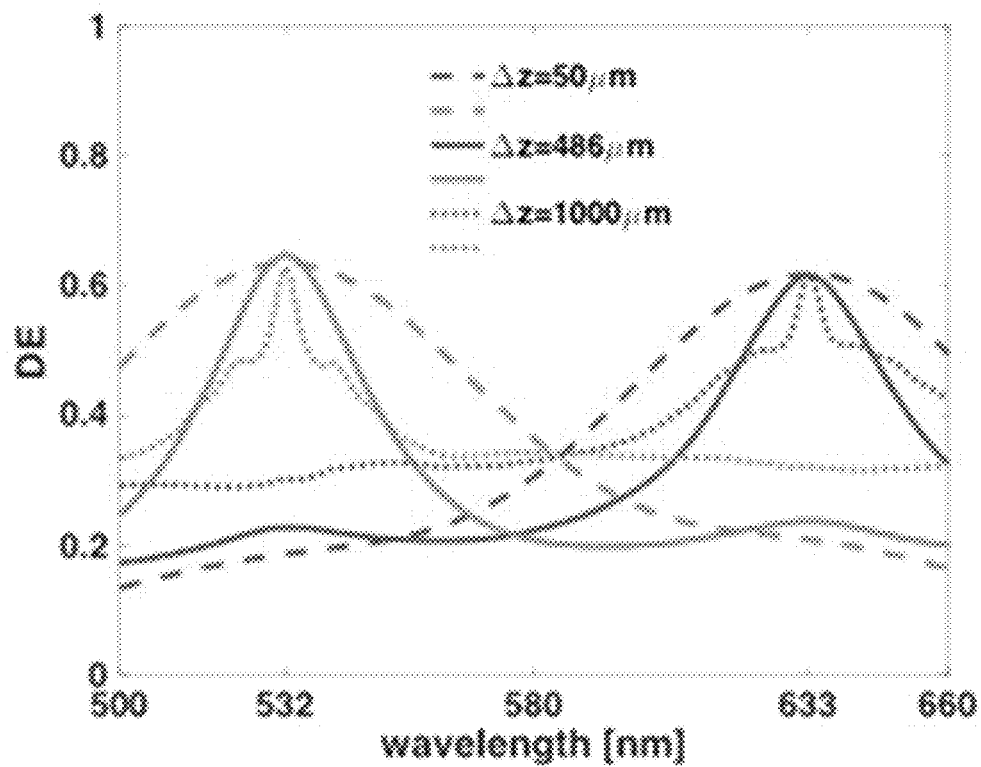
FIG. 4D illustrates characterization of 3D diffractive optics in case of frequency multiplexing showing wavelength selectivity of the letter "C" and "U" at layer separation of 50 µm, 486 µm, and 1000 µm in accordance with various embodiments of the present technology.

Last, the effect of layer separation on wavelength selectivity was explored. The layer separation is selected to be 50 µm, 486 µm (used in the design and experiment), and 1000 µm for two layers of 128×128 pixels. The wavelength in the reconstruction beam is changing from 500 nm to 660 nm in all three cases, as is shown in FIG. 4D. In accordance with various embodiments, a moderate increase was observed in selectivity as the effective thickness of the element increases. The effect can be explained by the fact that the buffer layer is where the propagation effect of diffraction occurs so a wavelength deviation of the input leads to a larger effect for longer distances. Similar tendencies are observed for angular multiplexing.

Experiments

Figure 5:
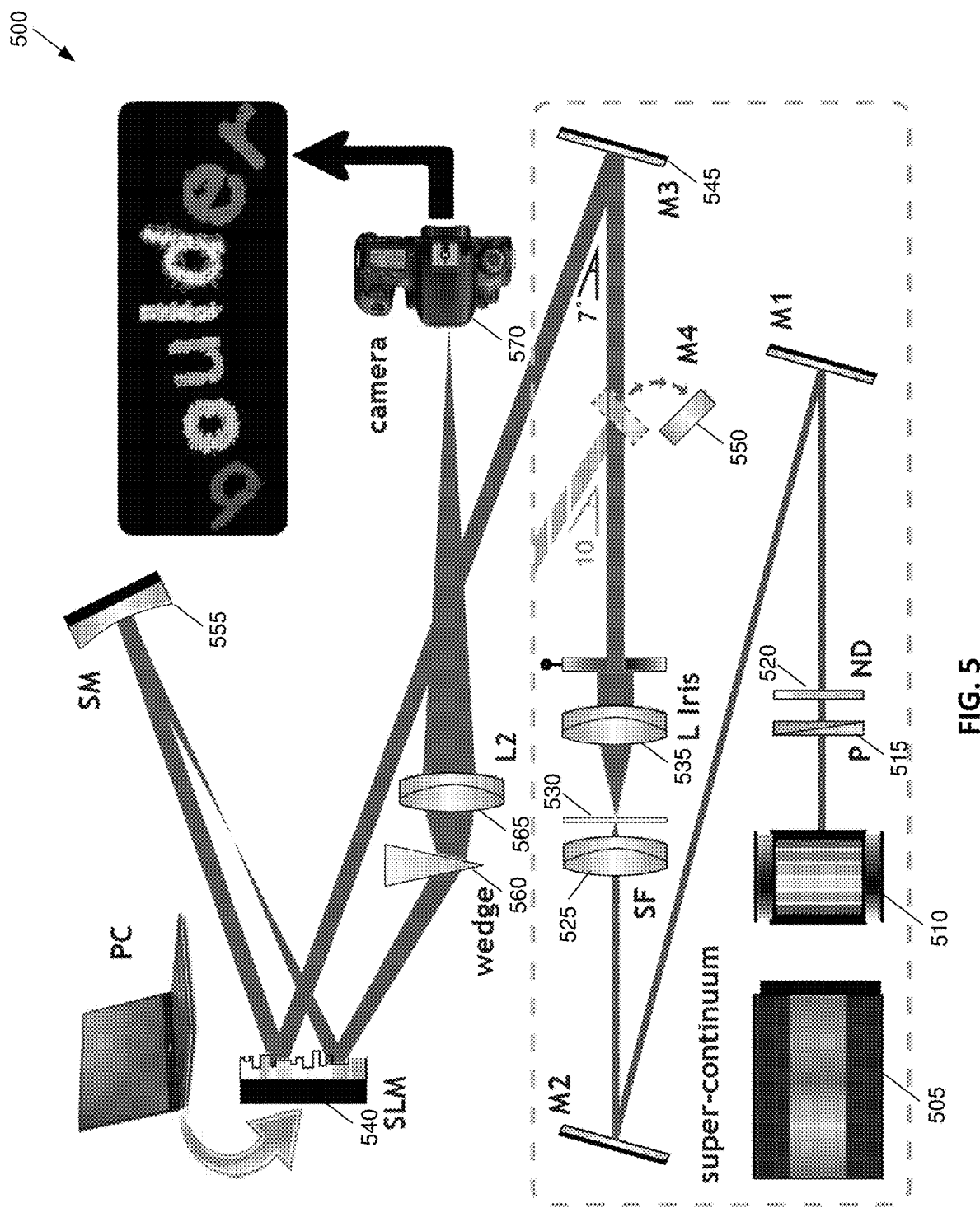
FIG. 5 illustrates an example of an experimental setup for 2D implementation and characterization of a dynamic 3D diffractive optics in accordance with some embodiments of the present technology.

Various experimental results for angular multiplexing and frequency multiplexing with two-layer continuous-phase 3D diffractive optics used in accordance with various embodiments of the present technology are now presented. An example of an experimental setup 500 is shown in FIG. 5. A super-continuum source 505 together with an acousto-optic tunable filter 510 (AOTF) provide narrowband laser output in the visible spectrum. The designed layers were implemented on a single high-resolution liquid crystal SLM, which is spatially divided into two sections. The first layer is imaged at a small distance in front of the second layer, with an imaging system formed by a concave spherical mirror with focal length of 200 mm. A color CMOS sensor is placed on the reconstruction plane after a Fourier lens to record the image.

As illustrated in FIG. 5, a supercontinuum fiber laser 505 (e.g., Fianium FemtoPower 1060) can be used to generate a tunable source covering spectral bandwidth from below 400 nm to beyond 900 nm. The beam is sent to a computer-controlled acousto-optic tunable filter 510 (AOTF) to provide a narrowband output with bandwidth of 2 nm to 4 nm at the desired wavelength. A linear polarizer 515 can be used to ensure the polarization of the incident beam is parallel to the orientation of the liquid crystal on the SLM panel (horizontal in our case), even though the output from the AOTF is already linearly polarized at that direction. A neutral density (ND) filter 520 can be used after the polarizer 515 to adjust the intensity of the laser beam. To improve the uniformity of the beam profile, a spatial filter system is employed consisting of a microscope objective 525 (e.g., 20×, 0.25NA) and a pinhole 530 (e.g., 50 µm diameter) followed by a collimating doublet achromatic lens 535 (L1). An iris adjusts the beam diameter for optimal illumination on the active area of the SLM 540 (e.g., Holoeye HEO1080P, with 1920×1080 pixels and 8 µm pixel pitch).

Some embodiments divide the SLM 540 into two parts side by side so that the largest beam size allowed could be up to 4.32 mm, and the pixel number of each single layer DOE could be up to 540×540. If more layers are designed, and a single SLM is still used, both the beam size and the DOE dimension will have to shrink. In the embodiments illustrated in FIG. 5, there is a two-layer diffractive optics with 128×128 pixels for angular multiplexing of two functions and 256×256 for frequency multiplexing of 7 functions. Accordingly, the beam size is adjusted to 1 mm and 2 mm for each case. To control the incident angle, a flat mirror 545 (M3) mounted on a rotation stage is used. It diverts the beam at 7° respect to the normal of the SLM panel. In angular multiplexing, a flipped mirror 550 (M4) is inserted at the proper position along the beam path to obtain an incident angle of 10°. The laser beam illumination setup is indicated by the square in FIG. 5.

In order to match the beam profile while suppressing the background of light unaffected by the SLM, the designed layers can be first padded with tilted blazed gratings. Then, the designed layers can be implemented on a single high-resolution SLM, which is horizontally divided in two sections. The beam incident on the right part (far side w.r.t. M3) displays the first layer. It is then imaged by a concave spherical mirror 555 (SM) with focal length of 200 mm at a small distance in front of the left section (near side w.r.t. M3), where the second layer is displayed. Based on these parameters, the distance between layers turns out to be 486 µm. Simulation results show that the misalignment between the two layers could be up to 1 pixel (8 µm) and still yield acceptable reconstructed images. Since the incident angle is small, the embodiments illustrated in FIG. 5 use a wedge 560 with 10° beam deviation (e.g., Thorlabs PS814) to separate the output from the input. An achromatic doublet lens 565 (L2) with focal length of 300 mm is followed to yield a Fourier plane (equivalent to the far field of the output form the diffractive optics) where a camera 570 is installed to capture the reconstructed image. Considering the beam is diverging after incidence on the SLM for the second time, the Fourier plane is located farther than one focal length after the lens.

Angular Multiplexing Demonstration

Figure 6A:
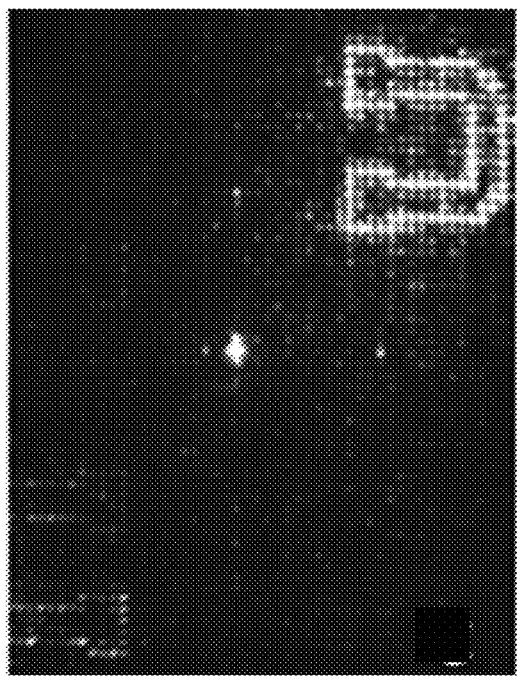
FIG. 6A shows experimental results for angular multiplexing with a reconstruction image with incident angle at T in accordance with some embodiments of the present technology.
Figure 6B:
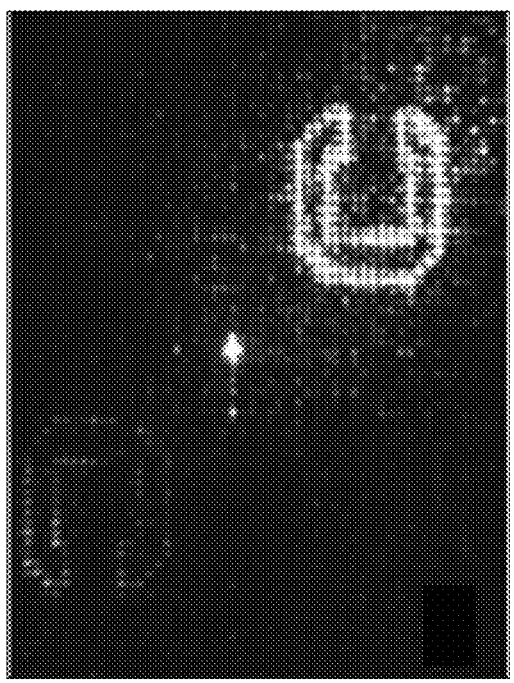
FIG. 6B shows experimental results for angular multiplexing with a reconstruction image with incident angle at 10° in accordance with various embodiments of the present technology.
Figure 6C:
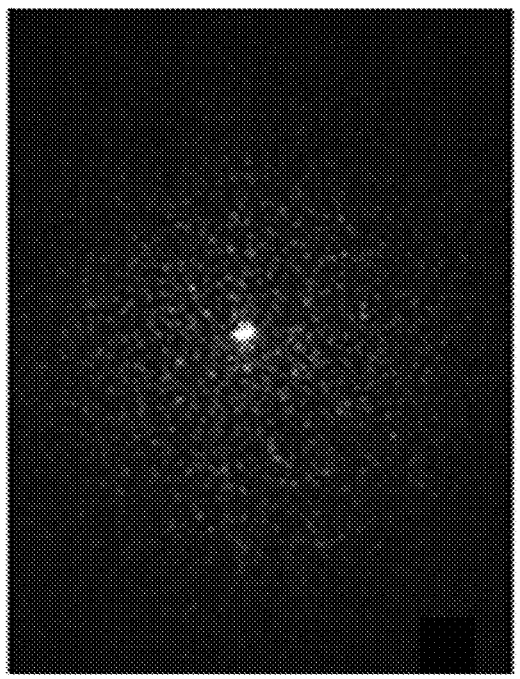
FIG. 6C shows experimental results for angular multiplexing with a speckle field with one layer blocked, indicating the 3D encryption is successful, in accordance with one or more embodiments of the present technology.

For angular multiplexing, some embodiments can set the output wavelength to be fixed (e.g., at 633 nm), and use a monochromatic camera (e.g., Point Grey CMLN-13S2M) to record the reconstructed image. The results are shown in FIGS. 6A-6C. When the flip mirror is down, the incident angle is at 7°, the letter "C" shows up on the reconstruction plane (FIG. 6A). As the flip mirror is switched up to get an incident angle of 10°, the letter "U" on the camera (FIG. 6B) can be seen. The diffraction efficiencies are 50.5% and 52.1% for "C" and "U", respectively. A week twin image can be noticed on the camera which does not appear in the design simulation. This is attributed to non-ideal imperfections of the SLM. To verify the design is successful, only one layer of the 3D diffractive optics can be illuminated, and a random speckle pattern is obtained (FIG. 6C). This indicates that the encryption is distributed among the layers of the 3D diffractive optics.

Frequency Multiplexing Demonstration

To demonstrate frequency multiplexing with high number of degrees of freedom, some embodiments can multiplex the functions (e.g., 7 functions) with different colors. Specifically, each letter in the word "boulder" was encoded with wavelength 460 nm, 496 nm, 532 nm, 568 nm, 600 nm, 633 nm, 694 nm, respectively.

There are three issues that had to be addressed in the experiment. The first one is coding capacity. Since there is more information to be encoded, the pixel number in each layer can be expanded from 128×128 to 256×256 to ensure the algorithm converges with acceptable crosstalk on the reconstruction plane.

The second issue is target scaling due to different diffraction angles at various wavelengths. In effect, the letters designed for shorter wavelength appear proportionally smaller on the reconstruction plane than the ones designed for longer wavelength. This can be compensated by resizing the letters by a scaling factor before running the design algorithm. For example, without resizing, the letter "b" is scaled by 633/460=1.38 w.r.t. the reference wavelength (633 nm), "o" is scaled by 633/496=1.28, and "r" is scaled by 633/694=0.91.

The third issue is phase shift compensation. This issue arises from the fact that the phase shift induced by each SLM pixel depends on both the applied voltage and working wavelength, as is given by the following equation:

$$\Phi(V, \lambda) = \frac{2\pi d}{\lambda} n(V, \lambda) \quad (11)$$

where d is the thickness of the liquid crystal, λ is the working wavelength, n is the refractive index, and V is the applied voltage, which changes the orientation of the liquid crystal molecules, thus producing various optical path differences for the selected wavelength.

The voltage is generated by the SLM's control circuit board, which converts the 256 phase patterns (0~2π) uploaded on the computer to (8 bit) electronic signals. In some embodiments, a lookup-table (LUT), either provided by the manufacturer or experimentally measured, can be built in the control circuit to establish a linear, or quasi-linear, relation between the addressed grey phase level and the actual phase delay. Therefore, for the same phase value of the DOE, the phase modulation on the SLM shifts by a constant coefficient as the working wavelength deviates from the designed one.

Figure 7:
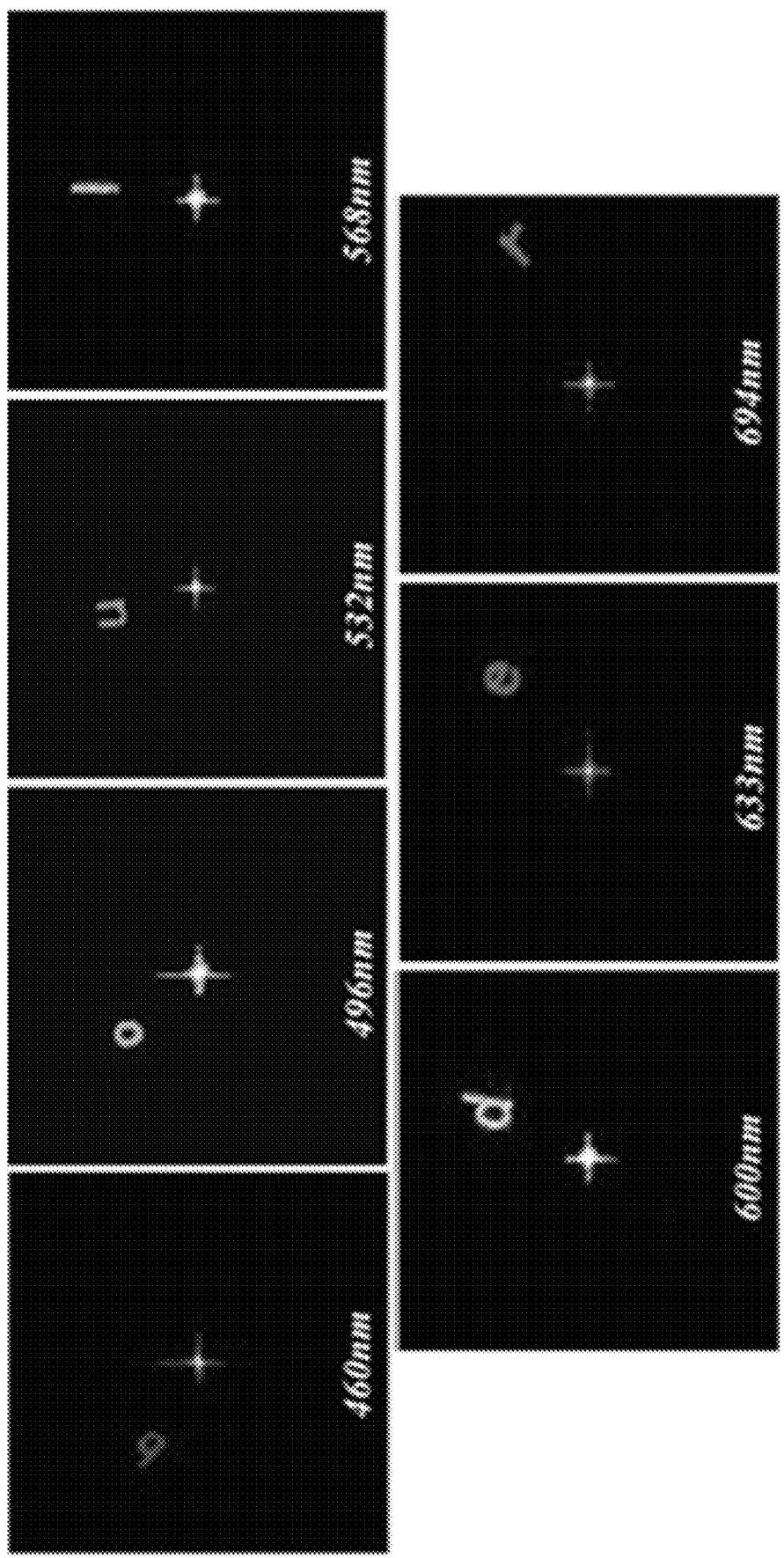
FIG. 7 shows some experimental results for frequency multiplexing with 2-layer diffractive optics implemented on a single SLM where the letters in the word "boulder" are reconstructed with wavelength 460 nm, 496 nm, 532 nm, 568 nm, 600 nm, 633 nm, and 694 nm, respectively, in accordance with various embodiments of the present technology.

For each layer of the 3D diffractive optics, N individual phase patterns $\phi_{\lambda,1}(x, y)$ can be calculated from the design algorithm. The task is to combine these independent phase patterns into one phase pattern while displaying the corresponding phase value for each predefined wavelength. Some embodiments can convert all the phase patterns to the reference wavelength 633 nm, for which the SLM is calibrated. The conversion can be done by multiplying a scaling factor $\beta_{\lambda,1} = \lambda_i/633$ nm to each individual phase pattern, where $\lambda_i$ is its corresponding wavelength. The design in each iteration can then be obtained by a modified parallel projection, with the phase shift compensation being taken into account:

$$\Phi_k(x, y) = \frac{1}{N} \sum_{i=1}^{N} \beta_{\lambda i} \phi_{\lambda i}(x, y) \quad (12)$$

where N is the total number of wavelengths used for frequency multiplexing. The reconstructed image is recorded with a color CMOS sensor (e.g., Canon 5D Mark II). The results are shown in FIG. 7.

The experimental diffraction efficiency for each reconstruction image is 38.2% (40.2%), 38.0% (38.9%), 38.5% (39.4%), 35.9% (38.2%), 41.1% (43.5%), 44.9% (47.0%), and 29.8% (30.7%), respectively, with values in simulation provided in the bracket for comparison. The efficiency is not as high as in angular multiplexing, because the information of each page decays as more functions are multiplexed. Other factors affecting the diffraction efficiency include the relatively broad spectrum of the laser source and imperfections of the SLM. However, negligible crosstalk among the reconstructions were observed.

Diffraction Efficiency Analysis 3D diffractive optics have several interesting advantages relative to thin DOEs in terms of diffraction efficiency, spectral/angular selectivity, as well as new functionalities such as synthetic 3D spatial-temporal wavefront encoding, engineered space-variant functions, and space-time pulse shaping. In accordance with various embodiments, the diffraction efficiency can be controlled and enhanced by proper design, due to the additional degrees of freedom provided by the third dimension, compared to 2D DOEs.

The system parameters of importance are the number of layers, N, layer separation, Δz, pixel sizes in the x and y directions, Δx and Δy, and number of pixels in the x and y directions, Nx and Ny. For the examples shown here, Δx=Δy=8 μm, Δz=486 μm and change N=2, 4, 6, . . . , 20, and Nx=Ny=256, 1024.

A frequency multiplexing scheme, in accordance with some embodiments, can be implemented with two wavelengths, 633 nm and 532 nm, to encode two desired reconstruction functions. For the purpose of investigating diffraction efficiency, the target images are two off-axis spots at different locations. The first (second) spot, which corresponds to the 633 nm (532 nm) illuminating wavelength is located halfway (three quarters) from the center to the edge of the far-field grid used.

Figure 8:
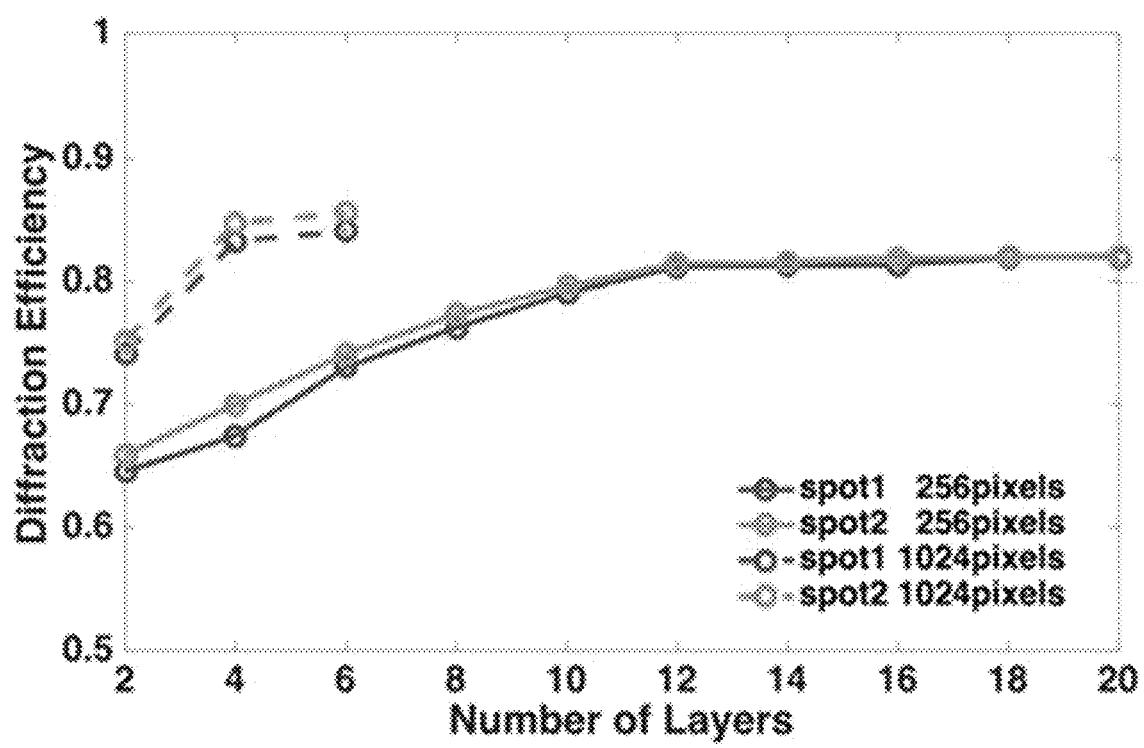
FIG. 8 is a plot showing the diffraction efficiency as functions of the number of layers and the number of pixels in each layer according to some embodiments of the present technology.

The 3D diffractive optics can be designed with the POCS algorithm with distribution-on-layers optimization. The two spots can be reconstructed as designed, namely the first spot (left) shows up for 633 nm wavelength reconstruction, and the second one (right) for 532 nm. The diffraction efficiency of both spots as functions of the number of layers and the number of pixels are shown in FIG. 8.

It takes less than 1 minute to finish the design at two layers with 256×256 pixels, on a 2.8 GHz quad-core CPU with 12 Gb memory. The diffraction efficiencies for the two spots are 64.55% and 66.68%, respectively. As the number of layers increased to 20, the diffraction efficiencies increased to 70.28% and 72.07%, respectively. In the embodiments illustrated, 1024×1024 pixels were used in each layer and the diffraction efficiencies for the two spots are 74.11% and 75.16%, respectively, when the number of layer is 2. The numbers increase to as large as 83.26% and 84.77%, respectively, as 6 layers are used in the design. Designs with more layers are beyond the computational power of a personal computer but are still possible with more powerful hardware.

This result, like all other results, confirms the hypothesis that 3D diffractive optics indeed provides additional degrees of freedom to enhance system performance such as diffraction efficiency. In accordance with various embodiments, further improvements in diffraction efficiency with more layers and more pixels are expected.

SLMs are common devices for light manipulation purposes. In particular, reflective SLMs are more popular because of shorter response time and higher fill factor. The ideal phase-only reflective SLM addresses arbitrary phase profiles onto a coherent light beam. However, the reflective display panels usually suffer deviations between the applied voltages and the designed phase values, due to the non-ideal production process. Those distortions could lead to performance degradation. The effect of SLM phase drifts on 3D diffractive optics in terms of diffraction efficiency and relative error is explored next.

The 3D diffractive optics is designed of 2 layers with 128×128 pixels in each layer. Letter "C" and "U" in a frequency multiplexing scheme, namely "C" with 633 nm illumination and "U" with 532 nm illumination. The pixel size is 8 μm×8 μm, and the layer separation is 486 μm. The simulation yields diffraction efficiencies of 62.5% for "C" and 65.5% for "U", with a relative error of 0.16 and 0.14 respectively.

Figure 9A:
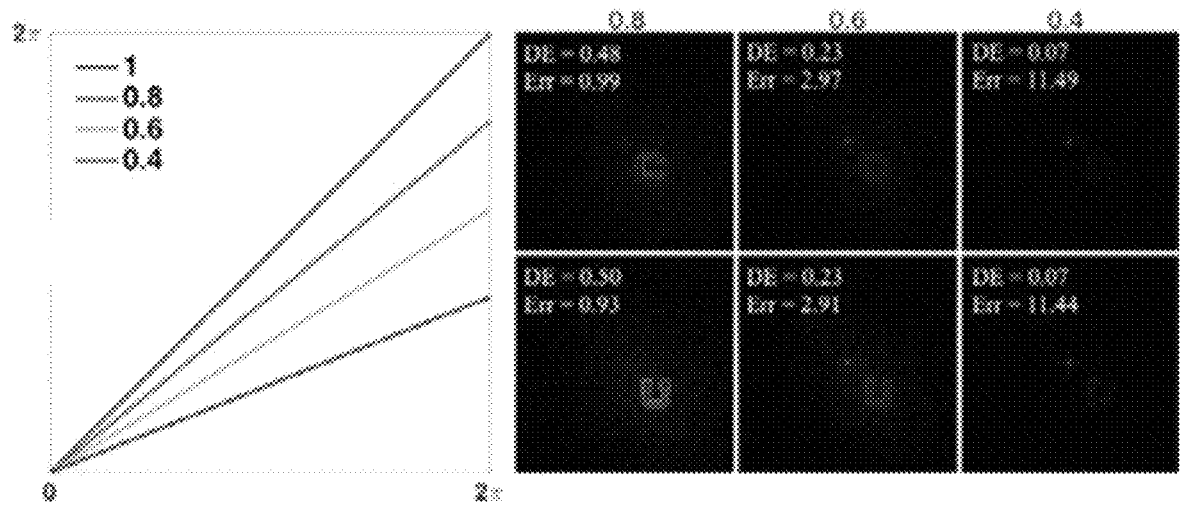
FIG. 9A shows simulation results for SLM phase deviation analysis with linear deviation of the phase map of 20% (0.8), 40% (0.6), and 60% (0.4) and the corresponding reconstructed images in accordance with various embodiments of the present technology.

The investigation is conducted in three aspects. The results are shown in FIG. 9. First, the linear deviation was tested. This applies to an SLM that is not properly calibrated, or the wavelength or direction of the incident beam is drifted from the designed value. The result is the phase modulation from the SLM is linearly shifted from the original by a constant coefficient. The coefficient was set to be 0.8, 0.6, and the 0.4, as is shown in FIG. 9A. The corresponding diffraction efficiencies for the far-field pattern decrease as the deviation becomes larger and as more energy being transferred to the DC term. Accordingly, as expected, the relative error increases.

Figure 9B:
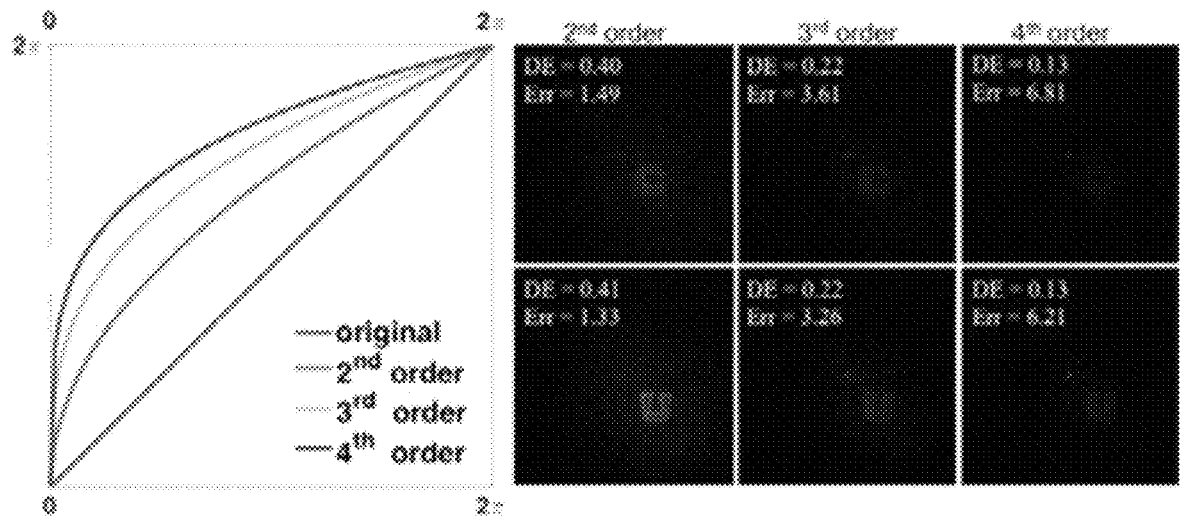
FIG. 9B shows simulation results for SLM phase deviation analysis with a phase map of nonlinear deviation of 2nd, 3rd, and 4th order with the corresponding reconstructed images in accordance with some embodiments of the present technology.

Next, the effect of a nonlinear deviation in the SLM phase was tested. This occurs when there are errors in the look-up table which is a built-in mechanism in the SLM's control circuit to linearly convert the gray level of the input phase pattern to the resulting phase retardation of the liquid crystal molecule by properly adjusting the applied voltage. The phase map of the designed DOEs were converted in a nonlinear fashion, for the 2nd, 3rd, and 4th order, as is shown in FIG. 9B. The diffraction efficiencies drop more as higher order nonlinear deviations are induced. A stronger DC term shows up as well as larger errors are being generated.

Figure 9C:
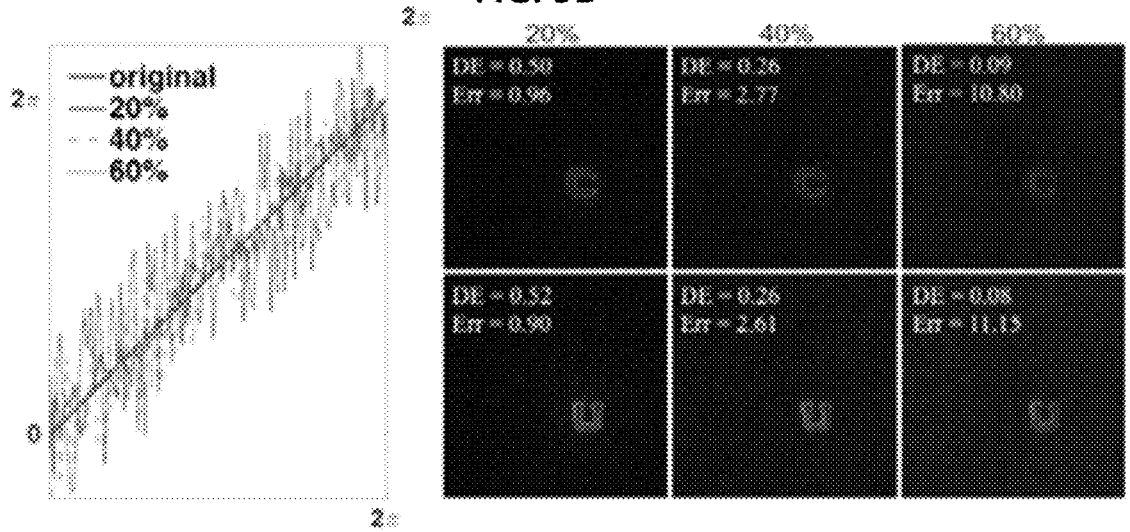
FIG. 9C shows simulation results for SLM phase deviation analysis with a phase map with added random noise at levels of 20%, 40%, and 60% with the corresponding reconstructed images in accordance with one or more embodiments of the present technology.

Next, random noise was added with different levels to the phase map. This is to simulate irregularities of liquid crystal cells, which cause a spatially varying phase response of the SLM. FIG. 9C shows results for random noise levels of 20%, 40%, and 60%. The diffraction efficiencies of both patterns are impaired as the noise level increases, and speckles start to appear in the background.

Figures 10A, 10B:
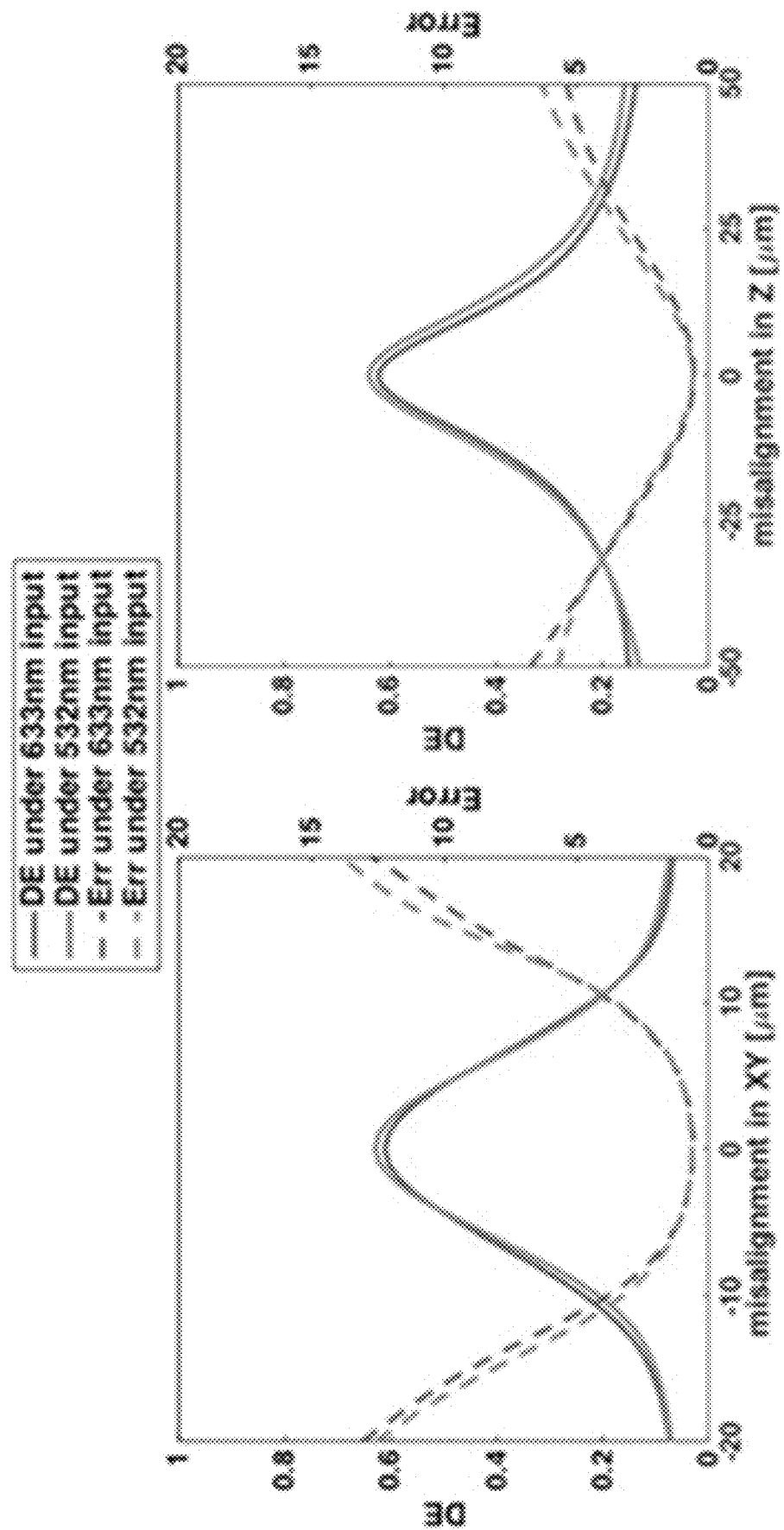
FIG. 10A-10B show simulation results for layer misalignment analysis in accordance with various embodiments of the present technology.

Finally, the effect of misalignment between the two layers was investigated. The design is up-sampled 8 times such that modeling of the layer can be shifted distances as small as 1 µm. The reconstructed pattern under both 633 nm and 532 nm illumination as the second layer is misaligned from −20 µm to 20 µm. The corresponding diffraction efficiency and relative error are plotted in FIG. 10A. The results show that with 2 layers, the misalignment tolerance could be up to 1 pixel (8 µm) and still yield acceptable reconstructed patterns. The alignment tolerance in longitudinal direction. In frequency multiplexing scheme, the second layer is misaligned from −50 µm to 50 µm with respect to the 486 µm layer separation in the design. The diffraction efficiency and relative error are plotted in FIG. 10B. Acceptable reconstructed patterns are obtained from in the misalignment range from −25 µm to 25 µm. Alignment tolerances become more critical as the number of layers is increased.

Experimental Details

Figure 11:
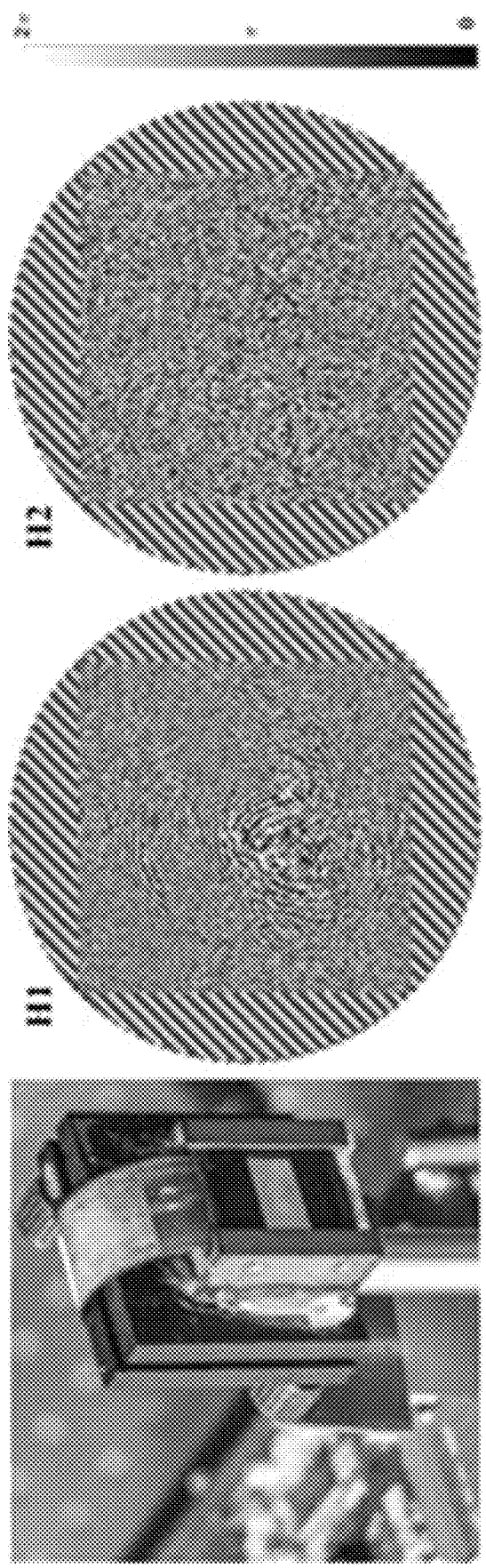
FIG. 11 shows designed layers for frequency multiplexing with 7 wavelengths so that the continuous phase patterns are padded with tilted blazed gratings to match with the beam profile (indicated by dashed circle) while suppressing the background of light unaffected by the SLM in accordance with various embodiments of the present technology.

For the design of the 7-function frequency multiplexing DOE presented above, the number of pixels in each layer was expanded to 256×256 to prevent crosstalk among the multiplexed output fields. Accordingly, the beam size was adjusted to 2 mm. To suppress the background light unaffected by the SLM, the designed layers are padded with tilted blazed gratings. The results are shown in FIG. 11.

The SLM is horizontally divided into two parts, left and right, to accommodate both layers. The beam first incident on the right part where the first layer is displayed, then imaged by a concave spherical mirror at a small distance front of the left part, where the second layer is displayed. The left side of FIG. 11 is the photo of experimental implementation.

Design of a 16-Layer 3D-DOE

Figure 12:
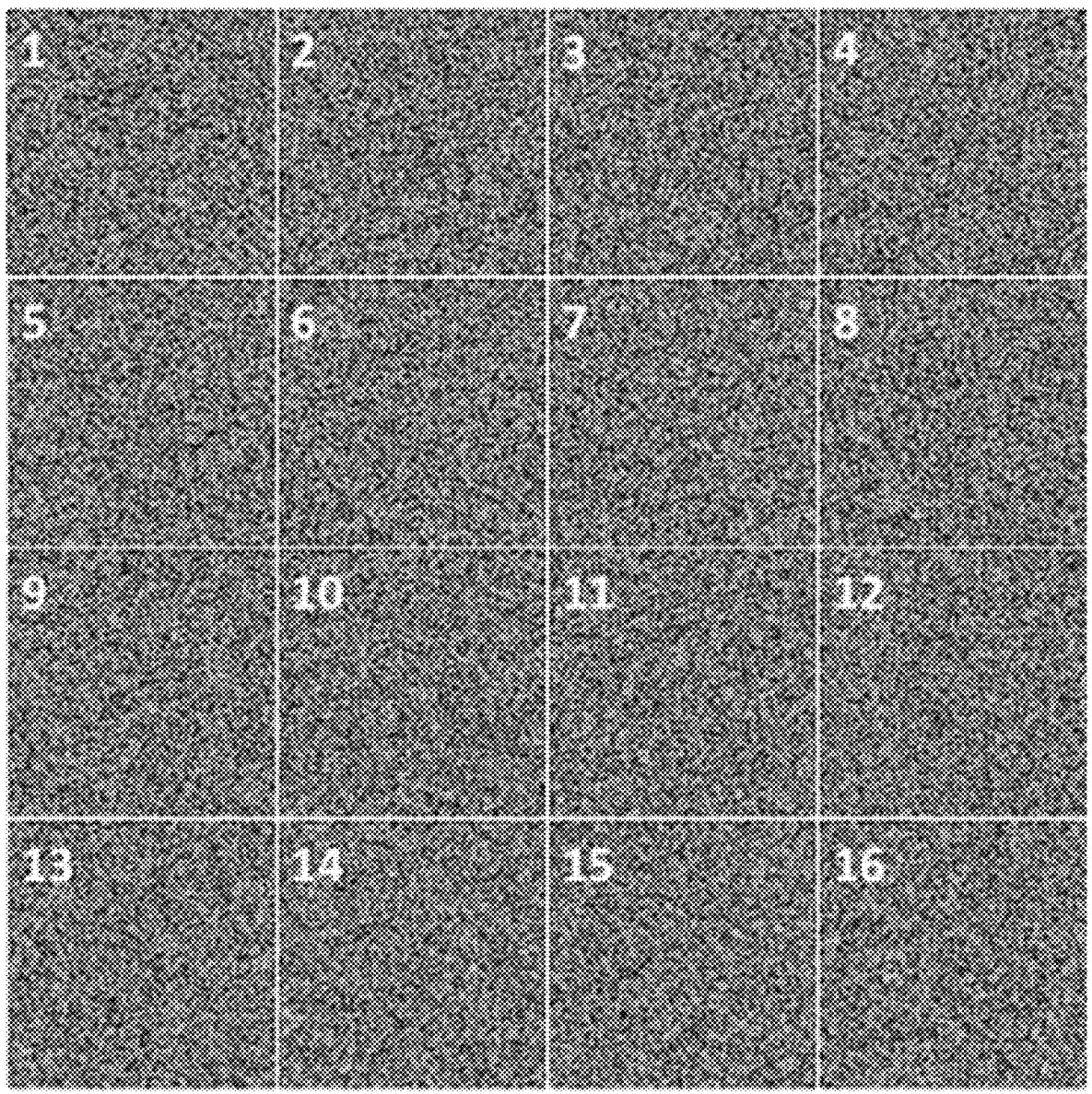
FIG. 12 illustrates the phase patterns of 3D diffractive optics with 16 layers designed to multiplex "C" and "U" in frequency in accordance with some embodiments of the present technology.

The results of a design of a 16-layer 3D diffractive optics for frequency multiplexing of 2 functions is now presented, namely the letters "C" and "U" from the "CU" logo, with 633 nm and 532 nm illumination, respectively. FIG. 10 shows the designed phase patterns, which improves the diffraction efficiency of the two far-field images to reach 77.4% and 81.8% from 62.1% and 65.4%. FIG. 12 illustrates the phase patterns of 3D diffractive optics with 16 layers. The device is designed to multiplex "C" and "U" in frequency in accordance with some embodiments of the present technology. The pixel number in each layer is 128×128, and the phase values are continuous.

Photonic Lantern

Figure 13:
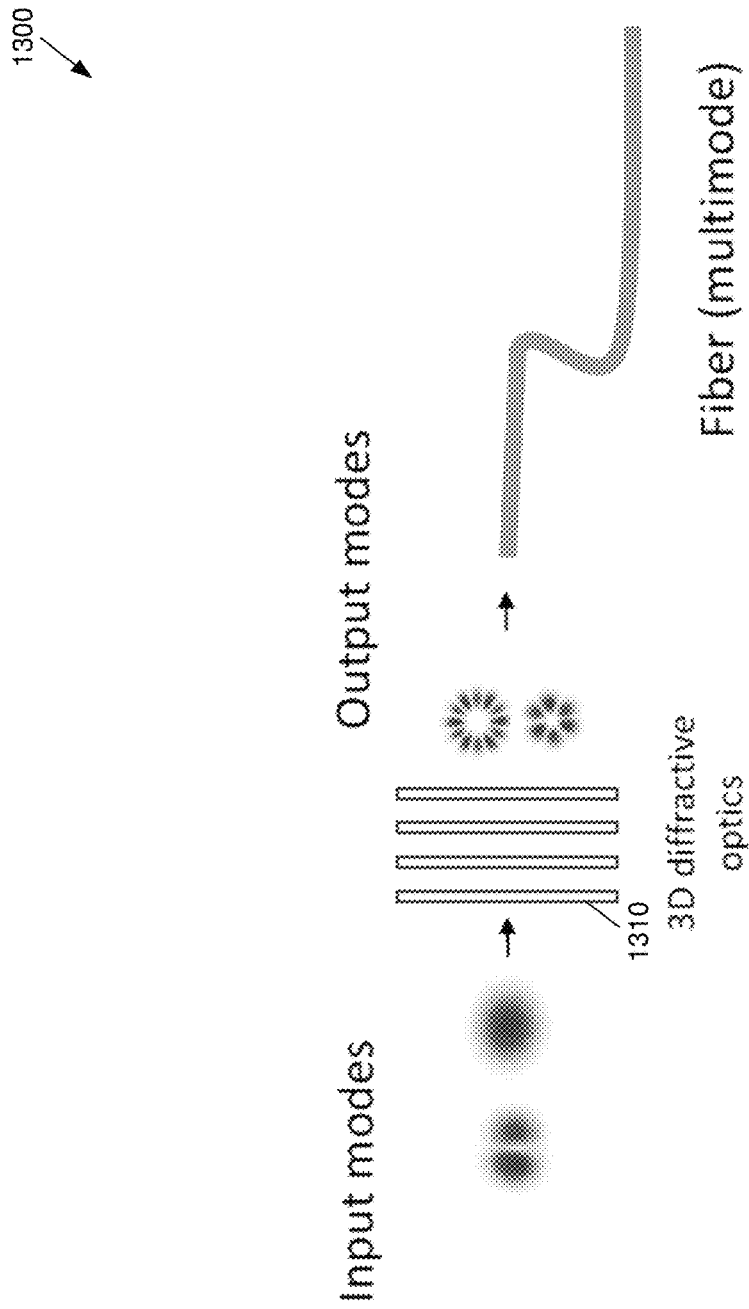
FIG. 13 illustrates an example of a photo lantern that may be used in some embodiments of the present technology.

FIG. 13 illustrates an example of a photonic lantern 1300 using a 3D DOE according to various embodiments of the present technology. A photonic lantern is a device that adiabatically merges several single-mode fiber modes into one multimode fiber core. The device generates low-loss interfaces between single-mode and multimode systems. Properly designed (for instance by the methods described herein) 3D diffractive optics 1310 can thus be used as photonic lanterns. FIG. 13 shows how a 3D diffractive optics device can be used to multiplex modes to launch arbitrary modes into a multimode fiber. Some embodiments use this device to multiplex different modes as well as to analyze the modes emerging from the fiber.

Computer Systemization

Figure 14:
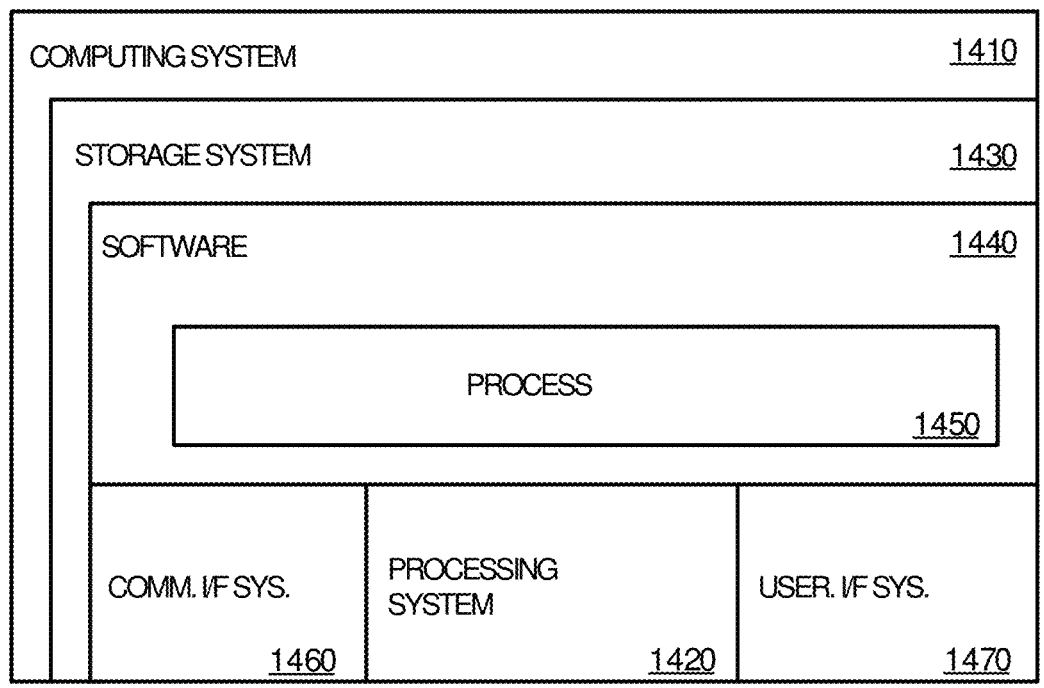
FIG. 14 illustrates an example of a computing system that may be used in some embodiments of the present technology.

FIG. 14 illustrates computing system 1410, which is representative of any system or collection of systems in which the various applications, services, scenarios, and processes disclosed herein may be implemented. For example, computing system 1410 may include a laptop computer, a tablet, a desktop computer, server computers, blade servers, rack servers, and/or any other type of computing system (or collection thereof) suitable for carrying out the operations described herein. Such systems may employ one or more virtual machines, containers, or any other type of virtual computing resource.

Computing system 1410 may be implemented as a single apparatus, system, or device or may be implemented in a distributed manner as multiple apparatuses, systems, or devices. Computing system 1410 includes, but is not limited to, processing system 1420, storage system 1430, software 1440, applications 1450, communication interface system 1460, and user interface system 1470. Processing system 1420 is operatively coupled with storage system 1430, communication interface system 1460, and an optional user interface system 1470.

Processing system 1420 loads and executes software 1440 from storage system 1430. When executed by processing system 1420, software 1440 directs processing system 1420 to operate as described herein for at least the various processes, operational scenarios, and sequences discussed in the foregoing implementations. Computing system 1410 may optionally include additional devices, features, or functionality not discussed for purposes of brevity.

Referring still to FIG. 14, processing system 1420 may comprise a micro-processor and other circuitry that retrieves and executes software 1440 from storage system 1430. Processing system 1420 may be implemented within a single processing device, but may also be distributed across multiple processing devices or sub-systems that cooperate in executing program instructions. Examples of processing system 1420 include general purpose central processing units, application specific processors, and logic devices, as well as any other type of processing device, combinations, or variations thereof.

Storage system 1430 may comprise any computer readable storage media readable by processing system 1420 and capable of storing software 1440. Storage system 1430 may include volatile and nonvolatile, removable and non-removable media implemented in any method or technology for storage of information, such as computer readable instructions, data structures, program modules, or other data.

Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1430 may also include computer readable communication media over which at least some of software 1440 may be communicated internally or externally. Storage system 1430 may be implemented as a single storage device, but may also be implemented across multiple storage devices or sub-systems co-located or distributed relative to each other. Storage system 1430 may comprise additional elements, such as a controller, capable of communicating with processing system 1420 or possibly other systems.

Software 1440 may be implemented in program instructions and among other functions may, when executed by processing system 1420, direct processing system 1420 to operate as described with respect to the various operational scenarios, sequences, and processes illustrated herein. For example, software 1440 may include program instructions for directing the system to perform the processes described above.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1440 may include additional processes, programs, or components, such as operating system software, virtual machine software, or application software. Software 1440 may also comprise firmware or some other form of machine-readable processing instructions executable by processing system 1420.

In general, software 1440 may, when loaded into processing system 1420 and executed, transform a suitable apparatus, system, or device (of which computing system 1410 is representative) overall from a general-purpose computing system into a special-purpose computing system. Indeed, encoding software on storage system 1430 may transform the physical structure of storage system 1430. The specific transformation of the physical structure may depend on various factors in different implementations of this description. Examples of such factors may include, but are not limited to, the technology used to implement the storage media of storage system 1430 and whether the computer-storage media are characterized as primary or secondary storage, as well as other factors.

For example, if the computer readable storage media are implemented as semiconductor-based memory, software 1440 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1460 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media.

User interface system 1470 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 1470. In some cases, the input and output devices may be combined in a single device, such as a display capable of displaying images and receiving touch gestures. The aforementioned user input and output devices are well known in the art and need not be discussed at length here. In some cases, the user interface system 1470 may be omitted when the computing system 1410 is implemented as one or more server computers such as, for example, blade servers, rack servers, or any other type of computing server system (or collection thereof).

User interface system 1470 may also include associated user interface software executable by processing system 1420 in support of the various user input and output devices discussed above. Separately or in conjunction with each other and other hardware and software elements, the user interface software and user interface devices may support a graphical user interface, a natural user interface, an artificial intelligence agent capable of assisting with automation of the copy and/or paste operations (e.g. an enhanced version of Microsoft's Cortana assistant, Amazon's Alexa, or Apple's Siri, Google's Assistant, etc.), or any other type of user interface, in which a user interface to a productivity application may be presented.

Communication between computing system 1410 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method to generate 3D diffractive functionality via 2D diffractive device layers, the method comprising:
    receiving a user-defined output of multiplexed wave fields with corresponding input of multiplexed fields;
    forward propagating an input of multiplexed fields to obtain output fields;
    specifying the 2D diffractive device layers via an optimization process to achieve a desired 3D functionality; and
    cascading the 2D diffractive device layers in a stratified, spatially separated, and layered arrangement such that at least one layer of the 2D diffractive device layers is placed in a plane that is neither an image plane nor a Fourier plane.

2. The method of claim 1 further comprising:
    forward propagating the input of multiplexed fields and backward propagating the output of multiplexed fields before and after each of the 2D diffractive device layers; and
    generating a parallel projection at each of the 2D diffractive device layers to create an updated layer design.

3. The method of claim 1 further comprising initializing a layer design of the 2D diffractive device layers.

4. The method of claim 3 further comprising setting each of the 2D diffractive device layers to have a random phase and unit amplitude.

5. The method of claim 1, wherein backward propagating the output multiplexed fields includes starting with a desired reconstruction field and using an inverse propagation to calculate a wave-field after each layer of the 2D diffractive device layers.

6. The method of claim 1, wherein a design of each layer of the 2D diffractive device layers is calculated in: a sequential form, a random fashion, or in parallel, the method further comprising:
    repeating forward propagating the input of multiplexed fields;
    backward propagating the output of multiplexed fields; and
    generating a parallel projection until a target quality or number of iterations is reached.

7. The method of claim 1, wherein specifying the 2D diffractive device layers includes creating a parallel projection based on a projection onto convex set (POCS) technique.

8. The method of claim 1, wherein the 2D diffractive device layers generate at least one of the following: frequency selective waves, space variant waves, angularly selective waves, azimuthally rotated waves, and modes matched in frequency or spatial shape to an optical waveguide or optical fiber.

9. A system comprising:
    an input light source; and
    a three-dimensional (3D) optical element including a plurality of stratified, spatially separated, layers, wherein the 3D diffractive optical element is configured to be illuminated by a light generated by the input light source, wherein the plurality of stratified, spatially separated layers of the 3D optical element includes multiple optical layers cascaded such that at least one layer is placed in a plane that is neither an image plane nor a Fourier plane, and wherein as light propagates though the 3D diffractive optical element, an amplitude and/or phase are modulated by each of the plurality of stratified, spatially separated layers.

10. The system of claim 9 further comprising a spatial light modulator (SLM) including the plurality of stratified, spatially separated layers.

11. The system of claim 9 further comprising an SLM that is spatially divided to accommodate different layers of the plurality of stratified, spatially separated layers, wherein the SLM is configured to switch designed phase patterns on the plurality of stratified, spatially separated layers of the 3D optical element.

12. The system of claim 9, wherein the plurality of stratified, spatially separated layers of the 3D optical element includes multiple optical layers cascaded such that at least one layer is placed a given distance from an image plane of an optical mask.

13. The system of claim 9, wherein the plurality of stratified, spatially separated layers include: a diffractive optical element, a phase mask, an amplitude mask, an amplitude/phase mask, gray-level masks, graded index of refraction structures, aspheric elements, lenses, prisms, gratings, or mirrors.

14. The system of claim 9, wherein the plurality of stratified, spatially separated layers are configured to operate in: transmission, reflection, or a combination of both.

15. The system of claim 9 further comprising at least one of: an imaging system, a microscopy system, a localization system, and an object tracking system.

16. The system of claim 9, wherein the 3D optical element is further configured to generate at least one of the following: frequency selective waves, space variant waves, angularly selective waves, azimuthally rotated waves, and modes matched in frequency or spatial shape to an optical waveguide or optical fiber.

17. The system of claim 9, wherein the 3D optical element is further configured to multiplex modes input into an optical waveguide or optical fiber.

18. The system of claim 9, wherein the 3D optical element is further configured to create multiple dynamic independent focused beams at different wavelengths.

19. The system of claim 9, wherein the 3D optical element is further configured to generate at least two independent optical patterns.

20. The system of claim 9, wherein the 3D optical element is further configured to encrypt information.

21. The system of claim 9, wherein the 3D optical element is further configured to: optically store information in memory, or provide an optical interconnection.

22. A system for generating 3D diffractive functionality via 2D diffractive device layers, the system comprising:
- means for receiving a user-defined output of multiplexed wave fields with corresponding input of multiplexed fields;
- means for forward propagating an input of multiplexed fields to obtain output fields;
- means for specifying the 2D diffractive device layers via an optimization process;
- means for initializing layer design of multiple layers of a diffractive optics element to achieve a desired 3D functionality; and
- means for cascading the 2D diffractive device layers in a stratified, spatially separated, and layered arrangement such that at least one layer of the 2D diffractive device layers is placed in a plane that is neither an image plane nor a Fourier plane.

* * * * *